United States Patent
Bahl et al.

(10) Patent No.: US 12,247,272 B2
(45) Date of Patent: Mar. 11, 2025

(54) ALUMINUM-CERIUM-COPPER ALLOYS FOR METAL ADDITIVE MANUFACTURING

(71) Applicants: Sumit Bahl, Knoxville, TN (US); Ryan R. Dehoff, Knoxville, TN (US); Hunter B. Henderson, Livermore, CA (US); Scott McCall, Livermore, CA (US); Ryan Ott, Ames, IA (US); Alexander J. Plotkowski, Knoxville, TN (US); Orlando Rios, Knoxville, TN (US); Amit Shyam, Knoxville, TN (US); Zachary C. Sims, Knoxville, TN (US); Kevin D. Sisco, Knoxville, TN (US); David Weiss, Manitowoc, WI (US); Ying Yang, Knoxville, TN (US)

(72) Inventors: Sumit Bahl, Knoxville, TN (US); Ryan R. Dehoff, Knoxville, TN (US); Hunter B. Henderson, Livermore, CA (US); Scott McCall, Livermore, CA (US); Ryan Ott, Ames, IA (US); Alexander J. Plotkowski, Knoxville, TN (US); Orlando Rios, Knoxville, TN (US); Amit Shyam, Knoxville, TN (US); Zachary C. Sims, Knoxville, TN (US); Kevin D. Sisco, Knoxville, TN (US); David Weiss, Manitowoc, WI (US); Ying Yang, Knoxville, TN (US)

(73) Assignees: UT-Battelle, LLC, Oak Ridge, TN (US); Lawrence Livermore National Security, LLC, Livermore, CA (US); Iowa State University Research Foundation, Inc., Ames, IA (US); University of Tennessee Research Foundation, Knoxville, TN (US)

( * ) Notice: Subject to any disclaimer, the term of this patent is extended or adjusted under 35 U.S.C. 154(b) by 127 days.

(21) Appl. No.: 17/084,575

(22) Filed: Oct. 29, 2020

(65) Prior Publication Data

US 2021/0130934 A1    May 6, 2021

Related U.S. Application Data

(60) Provisional application No. 62/978,857, filed on Feb. 20, 2020, provisional application No. 62/927,905, filed on Oct. 30, 2019.

(51) Int. Cl.
 *C22C 21/16* (2006.01)
 *B33Y 10/00* (2015.01)
 (Continued)

(52) U.S. Cl.
 CPC .............. *C22C 21/16* (2013.01); *B33Y 70/10* (2020.01); *C22C 21/14* (2013.01); *B33Y 10/00* (2014.12); *B33Y 80/00* (2014.12)

(58) Field of Classification Search
 CPC ......... C22C 21/16; C22C 21/14; B33Y 70/10; B33Y 10/00; B33Y 80/00
 See application file for complete search history.

(56) References Cited

U.S. PATENT DOCUMENTS

| | | | |
|---|---|---|---|
| 1,960,916 A | 5/1934 | Murphy et al. | |
| 2,656,270 A | 10/1953 | Russell | |

(Continued)

FOREIGN PATENT DOCUMENTS

| | | |
|---|---|---|
| CN | 104004947 A | 8/2014 |
| CN | 104711464 | 6/2015 |

(Continued)

OTHER PUBLICATIONS

Machine translation of Su Xiang [CN114438383A]. (Year: 2022).*

(Continued)

*Primary Examiner* — Brian D Walck
*Assistant Examiner* — Nazmun Nahar Shams
(74) *Attorney, Agent, or Firm* — Klarquist Sparkman, LLP

(57) ABSTRACT

Disclosed herein are embodiments of an Al—Ce—Cu alloy for use in additive manufacturing. The disclosed alloy embodiments provide fabricated objects, such as bulk components, comprising a heterogeneous microstructure and having good mechanical properties even when exposed to conditions used during the additive manufacturing process. Methods for making and using alloy embodiments also are disclosed herein.

22 Claims, 16 Drawing Sheets

(51) Int. Cl.
  *B33Y 70/10* (2020.01)
  *B33Y 80/00* (2015.01)
  *C22C 21/14* (2006.01)

(56) References Cited

U.S. PATENT DOCUMENTS

| | | |
|---|---|---|
| 3,252,841 A | 5/1966 | Foerster |
| 4,379,719 A | 4/1983 | Hildeman et al. |
| 4,464,199 A | 8/1984 | Hildeman et al. |
| 4,787,943 A | 11/1988 | Mahajan et al. |
| 4,915,869 A | 4/1990 | Aubert et al. |
| 4,950,452 A | 8/1990 | Masumoto et al. |
| 5,037,608 A | 8/1991 | Tarcy et al. |
| 5,074,935 A | 12/1991 | Masumoto et al. |
| 5,154,780 A | 10/1992 | Premkumar |
| 5,264,021 A | 11/1993 | Kita et al. |
| 5,318,642 A | 6/1994 | Kita |
| 5,320,688 A | 6/1994 | Masumoto et al. |
| 5,431,751 A | 7/1995 | Okochi et al. |
| 5,578,144 A | 11/1996 | Satou et al. |
| 5,647,919 A | 7/1997 | Kita et al. |
| 5,900,210 A | 5/1999 | Büchler et al. |
| 6,231,808 B1 | 5/2001 | Hashikura et al. |
| 6,248,453 B1 | 6/2001 | Watson |
| 7,811,395 B2 | 10/2010 | Pandey |
| 9,079,211 B1 | 7/2015 | Deshpande et al. |
| 9,394,596 B2 | 7/2016 | Kramer et al. |
| 9,963,770 B2 | 5/2018 | Rios et al. |
| 2003/0183306 A1 | 10/2003 | Hehmann et al. |
| 2004/0156739 A1 | 8/2004 | Song |
| 2004/0238150 A1 | 12/2004 | Adachi et al. |
| 2005/0199318 A1 | 9/2005 | Doty |
| 2005/0271543 A1 | 12/2005 | Pfannen-Mueller et al. |
| 2008/0219882 A1 | 9/2008 | Woydt |
| 2009/0263266 A1 | 10/2009 | Pandey |
| 2009/0288796 A1 | 11/2009 | Song et al. |
| 2010/0226817 A1 | 9/2010 | Pandey |
| 2010/0282428 A1 | 11/2010 | Pandey |
| 2012/0058353 A1 | 3/2012 | Komiyama et al. |
| 2012/0152414 A1* | 6/2012 | Che .................. B22F 1/105 148/438 |
| 2013/0312876 A1 | 11/2013 | Palm |
| 2014/0326368 A1 | 11/2014 | Okamoto |
| 2015/0135897 A1 | 5/2015 | Sutcliffe et al. |
| 2016/0053346 A1 | 2/2016 | Szuromi et al. |
| 2017/0096730 A1 | 4/2017 | Rios et al. |
| 2018/0237893 A1 | 8/2018 | Rios et al. |
| 2018/0291489 A1 | 10/2018 | Mann et al. |
| 2019/0085431 A1 | 3/2019 | Rios et al. |
| 2021/0032727 A1 | 2/2021 | Chehab |
| 2021/0276099 A1 | 9/2021 | Chehab |

FOREIGN PATENT DOCUMENTS

| | | | |
|---|---|---|---|
| CN | 109797326 A | * 5/2019 | |
| DE | 10 2011 111365 | 2/2013 | |
| GB | 1458180 A | * 12/1976 | ............. C22C 21/00 |
| JP | 06184712 | 7/1994 | |
| JP | H07 268597 | 10/1995 | |
| JP | 3392509 | 3/2003 | |
| WO | WO 02/086175 A1 | 10/2002 | |
| WO | WO 2011/035653 | 3/2011 | |
| WO | WO 2017/007908 A1 | 1/2017 | |
| WO | WO-2018119283 A1 * | 6/2018 | ............ B22F 3/1055 |
| WO | WO 2018/156651 A1 | 8/2018 | |
| WO | WO 2019/155180 | 8/2019 | |

OTHER PUBLICATIONS

Machine translation of Su Xiang et.al. [CN109797326A] (Year: 2019).*
Machine translation of Zhou Yamin, [CN103509977A] (Year: 2014).*
Binbin Zhao et.al. "High-temperature properties and microstructural evolution of Al—Cu—Mn—Re (La/Ce) alloy designed through thermodynamic calculation", Materials Science & Engineering A 758 (2019) 7-18. (Year: 2019).*
Abbas, "Effect of high power diode laser surface melting on wear resistance of magnesium alloys," *Wear*, vol. 260, pp. 175-180, May 10, 2005.
Audebert et al., "Production of glassy metallic layers by laser surface treatment," *Scripta Materialia*, 48(3):281-286, Feb. 2003.
Chen et al., "Mechanical Properties of Nanometric Al2O3 Particulate-Reinforced Al—Al11Ce3 Composites Produced by Friction Stir Processing," *Materials Transactions*, 51(5):933-938, Apr. 7, 2010.
Davis, "Aluminum and Aluminum Alloys," *ASM International*, pp. 1-2, 18, and 309-310 (1993).
Fan et al., "Dual characteristic of trace rare earth elements in a commercial casting Al—Cu—X alloy," *Rare Metals*, 34(5):308-313, May 2015.
Graham et al., "Coarsening of Eutectic Microstructures at Elevated Temperatures," *Transactions of the Metallurgical Society of AIME*, vol. 236, pp. 94-102, Jan. 1966.
International Search Report and Written Opinion issued for International Application No. PCT/US2016/41293 on Nov. 17, 2016.
International Search Report and Written Opinion issued for International Application No. PCT/US2017/042208 on Oct. 20, 2017.
International Search Report and Written Opinion issued for International Application No. PCT/US2017/042203 on Oct. 20, 2017.
International Search Report and Written Opinion issued for International Application No. PCT/US2018/019046 on May 9, 2018, 21 pages.
International Search Report and Written Opinion issued for International Application No. PCT/US2018/051218 on Dec. 21, 2018, 12 pages.
Jun et al., "Characterization and wear resistance of laser surface melting AZ91D alloy," *Journal of Alloys and Compounds*, vol. 455, pp. 142-147, Jan. 16, 2007.
Knipling et al., "Criteria for developing castable, creep-resistant aluminum-based alloys—A review," *Z. Metallkd.*, 97(3):246-265, Mar. 2006.
Manca et al., "Microstructure and Properties of Novel Heat Resistant Al—Ce—Cu Alloy for Additive Manufacturing," *Metals and Materials International*, 8 pages (Nov. 2018) [available online: https://doi.org/10.1007/s12540-018-00211-0].
Non-Final Office Action issued for U.S. Appl. No. 16/132,231 on Jun. 15, 2021, 15 pages.
Plotkowski et al., "Corrigendum to 'Evaluation of an Al—Ce alloy for additive manufacturing,'" [Acta Mater. 126 (2017) 507-519] *Acta Materialia*, vol. 159, pp. 439-441, Aug. 22, 2018.
Plotkowski et al., "Evaluation of an Al—Ce alloy for laser additive manufacturing," *Acta Materialia*, vol. 126, pp. 507-519, Dec. 27, 2016.
Sims et al., "Cerium-Based, Intermetallic-Strengthened Aluminum Casting Alloy: High-Volume Co-product Development," *JOM*, 68(7):1940-1947, May 23, 2016.
Sims et al., "Characterization of Near Net-Shape Castable Rare Earth Modified Aluminum Alloys for High Temperature Application," *Light Metals*, ed. Edward Williams, pp. 111-114, 2016.

(56) References Cited

OTHER PUBLICATIONS

Tomida et al., "Improvement in wear resistance of hyper-eutectic Al—Si cast alloy by laser surface remelting," *Surface and Coatings Technology*, vol. 169-170, pp. 468-471, 2003.

Trevisan, "On the Selective Laser Melting (SLM) of the AlSi10Mg Alloy: Process, Microstructure, and Mechanical Properties," *Materials*, 10(76):1-23, Jan. 2017.

Yao et al., "Phase relations in the Cu-poor part of the Ce—Al—Cu system at 503 K," *Journal of Alloys and Compounds*, 484(1-2):86-89, Sep. 18, 2009.

Yao et al., "Effects of La on the age hardening behavior and precipitation kinetics in the cast Al—Cu alloy," *Journal of Alloys and Compounds*, 540(5):154-158, Jun. 26, 2012.

Yilmaz et al., "The microstructure and mechanical properties of unidirectionally solidified Al—Si alloys," *Journal of Materials Science*, vol. 24, pp. 2065-2070, 1989.

Zhang et al., "Effect of substituting cerium-rich mischmetal with lanthanum on microstructure and mechanical properties of die-cast Mg—Al—Re alloys," *Materials and Design*, vol. 30, pp. 2372-2378, Nov. 7, 2008.

Final Office Action issued for U.S. Appl. No. 16/132,231 on Dec. 27, 2021 (13 pages).

Final Office Action issued for U.S. Appl. No. 16/132,231 on Jan. 25, 2023 (12 pages).

Li et al., "Corrosion mechanism associated with T1 and T2 precipitates of Al—Cu—Li alloys in NaCl solution", *Journal of Alloys and Compounds*, 460, pp. 688-693 (2008).

Non-Final Office Action issued for U.S. Appl. No. 16/132,231 on Jun. 16, 2022 (14 pages).

Raghavan, "Al—Cu—Li (Aluminum-Copper-Lithium)", *Journal of Phase Equilibria and Diffusion*, vol. 31, No. 3, pp. 288-290 (2010).

Czerwinski et al., "On the Al-$Al_{11}Ce_3$ Eutectic Transformation in Aluminum-Cerium Binary Alloys," *Materials* 13:4549 (27 pages), 2020.

Gallo et al., "Aluminum Fluxes and Fluxing Practice," *ASM Handbook* (10 pages), 2008.

Jin et al., "Thermodynamic evaluation and optimization of Al—La, Al—Ce, Al—Pr, Al—Nd and Al—Sm systems using the Modified Quasichemical Model for liquids," *CALPHAD: Computer Coupling of Phase Diagrams and Thermochemistry*, 35(1): 30-41, Dec. 14, 2010.

Kang et al., "Critical evaluation and thermodynamic optimization of the Al—Ce, Al—Y, Al—Sc and Mg—Sc binary systems," *Computer Coupling of Phase Diagrams and Thermochemistry*, 32(2): 413-422, Mar. 27, 2008.

Meng et al., "Thermodynamic optimization of the Al—Yb binary system," *Journal of Alloys and Compounds*, 452(2): 279-282, Dec. 5, 2006.

Prakash et al., "The Effect of Mg Addition on Microstructure and Tensile and Stress Rupture Properties of a P/M Al-Fe—Ce Alloy," *Scripta Materialia* 39(7):867-872, 1998.

Riani et al., "Ternary rare-earth aluminum systems with copper: a review and a contribution to their assessment," *Journal of Phase Equilibria and Diffusion*, 25(1): 22-52, Feb. 2004.

Van Dalen et al., "Erbium and ytterbium solubilities and diffusivities in aluminum as determined by nanoscale characterization of precipitates," *Acta Materialia*, 57(14):4081-4089, Jun. 6, 2009.

\* cited by examiner

ALUMINUM-CERIUM-COPPER ALLOYS FOR METAL ADDITIVE MANUFACTURING

CROSS REFERENCE TO RELATED APPLICATION

This application claims the benefit of the earlier filing date of U.S. Provisional Patent Application No. 62/927,905, filed on Oct. 30, 2019, and U.S. Provisional Patent Application No. 62/978,857, filed on Feb. 20, 2020; each of these prior applications is incorporated herein by reference in its entirety.

ACKNOWLEDGMENT OF GOVERNMENT SUPPORT

This invention was made with government support under Contract No. DE-AC05-00OR22725, DE-AC02-07CH11358, and DE-AC52-07NA27344 awarded by the U.S. Department of Energy. The government has certain rights in the invention.

FIELD

The present disclosure is directed to embodiments of an aluminum-cerium-copper-based alloy (also referred to as an "Al—Ce—Cu"-based alloy) designed for use in additive manufacturing, and additive manufacturing method embodiments using the same to provide high-strength products for use in various industrial applications.

PARTIES TO JOINT RESEARCH AGREEMENT

The claimed invention arose under an agreement between UT-Battelle, LLC, University of Tennessee Research Foundation, Iowa State University of Science and Technology, Lawrence Livermore National Laboratory, and Eck Industries, Inc., funded by the Critical Materials Institute of the United States Department of Energy, which agreement was in effect on or before the effective filing date of the claimed invention.

BACKGROUND

Aluminum alloys are being increasingly adopted in transportation, aerospace, and defense applications to replace more dense materials, such as Ti- and Fe-based alloys. Additive manufacturing (AM) offers a route for manufacturing complex designs for further weight savings and improved performance; however, very few existing Al alloys are well suited for AM process conditions. Instead, Al alloys used in the art typically are designed for wrought processing and post-process aging. Such Al alloys, however, tend to exhibit hot-cracking under welding and AM conditions and also exhibit poor high-temperature performance, losing a large fraction of their strength, particularly in the range of 250-450° C. There exists a need in the art for Al-based alloy embodiments that can be used in AM methods to prepare bulk alloys and that also exhibit good mechanical strength and other properties at high temperatures.

SUMMARY

Disclosed herein are alloy composition embodiments for additive manufacturing. In one embodiment, the alloy composition comprises 1 wt % to 35 wt % cerium; 3 wt % to 35 wt % copper; 0 wt % to 3 wt % manganese; 0 wt % to 3 wt % iron; 0 wt % to 2 wt % magnesium; 0 wt % to 2 wt % zirconium; 0 wt % to 2 wt % nickel; less than 1 wt % silicon; a balance of aluminum; and wherein the amount cerium and copper present in the alloy composition are sufficient to cause the formation of at least one intermetallic selected from $Al_8CeCu_4$, $Al_{24}Cu_8Ce_3Mn$, $Al_{10}CuCe_2$, $Al_{11}Ce_3$, or $Al_2Cu$. In an independent embodiment, the alloy composition does not comprise (i) 3 wt % Ce if 7 wt % Cu is present; or (ii) 3 at % Ce if 7 at % Cu is present.

In additional embodiments, an alloy composition for additive manufacturing is disclosed, comprising: cerium and copper, wherein the cerium and copper are independently present in an amount sufficient to provide at least one of an $Al_8CeCu_4$, $Al_{24}Cu_8Ce_3Mn$, $Al_{10}Cu_7Ce_2$, $Al_{11}Ce_3$, or $Al_2Cu$ intermetallic phase in an additively manufactured component; and a balance of aluminum.

Also disclosed are embodiments of a fabricated object comprising the alloy of claim 1, wherein the fabricated object comprises a heterogeneous microstructure having an aluminum-based matrix phase and an intermetallic phase, wherein the aluminum-based matrix phase further comprises isolated features with an average length of 50 nm to 50 μm; and the intermetallic phase further comprises lattice-like structures occupying the regions between the aluminum-based matrix features, with a thickness ranging from 10 nm to 100 nm.

Also disclosed are embodiments of a method, comprising (a) combining aluminum with (i) copper in an amount ranging from 3 wt % to 35 wt %, and (ii) cerium in an amount ranging from 1 wt % to 35 wt % to form an aluminum-based alloy composition; (b) adding a first amount of feedstock comprising the aluminum-based alloy composition to a build platform; (c) exposing the first amount, or a portion thereof, of the feedstock to an energy source to provide a first energy-treated region on the build platform; (d) adding a second amount of the feedstock to the build platform wherein the second amount of the feedstock is positioned immediately adjacent to the first energy-treated region on the build platform; and (e) exposing the second amount, or a portion thereof, of the feedstock to the energy source to provide a second energy-treated region on the build platform.

The foregoing and other objects and features of the present disclosure will become more apparent from the following detailed description, which proceeds with reference to the accompanying figures.

BRIEF DESCRIPTION OF THE DRAWINGS

FIG. 5A shows that the microstructure comprises cellular aluminum matrix regions shown as the dark regions in the micrographs, and one or more intermetallic phases shown as bright regions in the micrographs; FIGS. 5B and 5C are higher magnification views of the melt pool boundary region showing a coarsening of the aluminum matrix regions.

FIG. 6A shows that the microstructure comprises cellular aluminum matrix regions shown as the dark regions in the micrographs, and one or more intermetallic phases shown as bright regions in the micrographs; FIGS. 6B and 6C are higher magnification views of the melt pool boundary region showing a coarsening of the aluminum matrix regions.

FIG. 7A shows that the microstructure comprises cellular aluminum matrix regions shown as the dark regions in the micrographs, and one or more intermetallic phases shown as bright regions in the micrographs; FIGS. 7B and 7C are higher magnification views of the top melt pool region near the melt pool boundary, showing a plurality of rosette-shaped aluminum matrix phase formations.

FIGS. 8A-8B show tensile results for samples of an Al—Ce—Cu alloy according to the embodiments disclosed herein, wherein FIG. 8A shows tensile stress-strain curves for samples of the Al—Ce—Cu alloy according measured at a variety of temperatures; and FIG. 8B shows yield stress, tensile strength, and elongation for samples of the Al—Ce—Cu alloy at various test temperatures.

FIG. 12A shows a region of relatively uniform distribution of aluminum matrix phases and intermetallic phases; FIG. 12B shows a detail view of several cellular aluminum matrix phase structures separated by an intermetallic phase with a small number of rod- or plate-like precipitates shown in the aluminum matrix phase structures; FIG. 12C shows a portion of a cellular aluminum matrix structure surrounded by an intermetallic phase and having a rod-or plate-shaped precipitate formed therein; FIG. 12 D shows an atomic resolution view of the rod- or plate-shaped precipitate formed within the aluminum matrix structure.

FIG. 13A shows a region of relatively uniform distribution of aluminum matrix phases and intermetallic phases; FIG. 13B shows a detail view of several cellular aluminum matrix phase structures separated by an intermetallic phase with a small number of rod- or plate-like precipitates and a small number of spherical intermetallic phases shown in the aluminum matrix phase structures; FIG. 13C shows an atomic resolution view of the rod- or plate-shaped precipitate formed within the aluminum matrix structure.

FIGS. 14 A-14D are scanning electron microscopy micrographs of component additively manufactured from an Al—Ce—Cu—Zr alloy according to embodiments disclosed herein, wherein the micrographs show the as-fabricated microstructure of a component fabricated from the Al—Ce—Cu—Zr alloy at various laser travel speeds.

DETAILED DESCRIPTION

1. Overview of Terms

Figure 1:
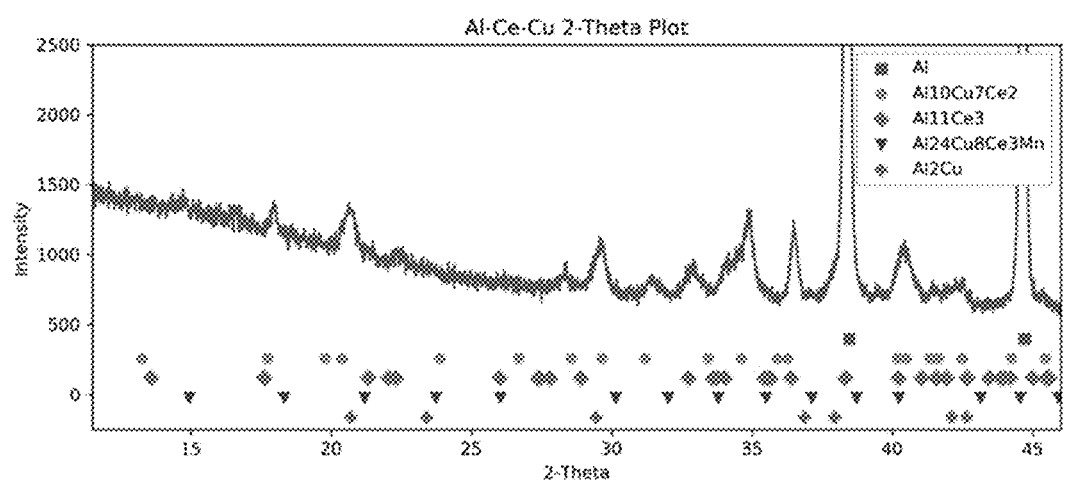
FIG. 1 is a graph showing the X-ray diffraction data of an Al—Ce—Cu alloy according to embodiments herein, wherein reference points are provided for the expected locations of X-ray diffraction peaks for various phases containing aluminum, cerium, copper, and/or manganese.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and compounds similar or equivalent to those described herein can be used in the practice or testing of the present disclosure, suitable methods and compounds are described below. The compounds, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

The notation "Al-aCe-bCu," (or "AlaCebCu") as used in certain embodiments described herein, indicates the composition of the alloy, where, unless otherwise noted, "a" is the percent by weight of the cerium in the alloy and where "b" is the percent by weight of the copper in the alloy. For example, Al-10Ce-8Cu indicates an alloy of 10 wt % Ce and 8 wt % Cu. As disclosed herein, the Al—Ce—Cu alloy can comprise additional minor alloying elements and/or trace impurities. In such embodiments, such components can be present in trace amounts that do not significantly modify the balance weight % of aluminum, unless expressly stated otherwise. For example, the balance weight percent of the alloy can comprise aluminum and trace impurities at very low levels. In some instances, composition data is presented in atomic percent, in which case units of at % are used.

Alloy compositions disclosed herein and items fabricated from those alloy compositions using additive manufacturing processes described herein may, in certain embodiments, have microstructures with a number of irregularly-shaped features. When discussing the size or average size of these features, measurements are described in the direction of the longest axis that may be drawn through the feature. In such embodiments, it is to be understood that a description of the size or average size in the direction of the longest axis places no limitations on the measurements of the aforementioned features in any other direction.

The following terms and definitions are provided:

Adjacent: When used in reference to the position of one or more layers making up a fabricated object made using an additive manufacturing process, this term refers to a physical orientation (or ordering) of a reference layer (e.g., a first layer of a feedstock that is provided and subjected to the energy source used in the additive manufacturing process) and another layer (e.g., a subsequent layer of a feedstock that is provided and subjected the energy source used in the additive manufacturing process) wherein the reference layer and the other layer are physically associated through one or more intervening layers (e.g., one or more layers of a feedstock that are provided and subject to the energy source used in the additive manufacturing process).

Alloy: A solid or liquid mixture of two or more metals, or of one or more metals with certain metalloid elements.

Aluminum Matrix: The primary aluminum phase in an alloy embodiment, such as the alloy phase having aluminum atoms arranged in a face-centered cubic structure, optionally with other elements in solution in the aluminum structure.

Cellular Feature: When used in reference to the microstructure of an alloy, a cellular feature is a microstructural region of a particular chemistry that is completely enclosed by a region of different chemistry.

Cellular Microstructure: When used in reference to the disposition of one or more phases in the microstructure, this term refers to a microstructure having a plurality of cellular features isolated by regions of differing chemistry.

Dendrite: A characteristic tree-like structure of crystals that grows as molten metal solidifies.

Eutectic Structure/Composition: A homogeneous solid structure formed when multiple solid phases grow together in a cooperative manner from a liquid or molten material. For binary materials, a super lattice is formed having a unique molar ratio between the two alloying elements. At this molar ratio, the mixtures melt as a whole at a specific temperature—the eutectic temperature. At other molar ratios for the binary material, one component of the mixture will melt at a first temperature and the other component(s) will melt at a different (e.g., higher) temperature.

Fabricated Object: An object (e.g., a component or a layer) formed during an additive manufacturing process, wherein a feedstock (e.g., a feedstock powder) is exposed to an energy source to form a shape (e.g., a consolidated pre-defined shape). Any particular shape is contemplated herein, but when the object is "fabricated," the object is intended to be different (e.g., in terms of exhibited properties, or in terms of form, and/or intermetallic composition) from the feedstock (or feedstock powder) used to prepare the fabricated object.

Feedstock (or Feedstock Powder): In some embodiments, this term refers to an alloy composition as described herein (wherein the alloying metals or metal precursors are pre-mixed and/or provided by an atomized alloy ingot) that is used to form a layer of a fabricated object made using the AM methods described herein. In some other embodiments, this term can refer to the starting materials (e.g., individual metals or metal precursors that are not pre-mixed and/or provided by alloy atomized ingots) that are used to form a layer of a fabricated object made using the AM methods described herein. In some particular embodiments, the feedstock can be a powder.

Intermetallic Phase: A solid-state compound present in a fabricated object comprising an alloy embodiment of the present disclosure. In some embodiments, the intermetallic phase contains two or more metallic elements and can exhibit metallic bonding, defined stoichiometry, and/or an ordered crystal structure, optionally with one or more non-metallic elements. In some instances, a fabricated object comprising an alloy of the present disclosure may include regions of a single metal (e.g., Al) and regions of an intermetallic phase (e.g., a ternary intermetallic phase like $Al_8CeCu_4$, $Al_{24}Cu_8Ce_3Mn$, or $Al_{10}Cu_7Ce_2$; and/or one or more additional binary phases like $Al_{11}Ce_3$ or $Al_2Cu$; and/or quaternary intermetallic phases). Additional intermetallic phases are described herein.

Immediately Adjacent: When used in reference to the position of one or more layers provided and/or made during an additive manufacturing process used to make fabricated objects of the present disclosure, this term refers to a physical orientation (or ordering) of the reference layer and another layer wherein the reference layer and the other layer are in direct physical contact (e.g., the reference layer is positioned on top of, on the bottom of, or to the immediate left/right of the other layer).

Lattice-Like Microstructure: When used in reference to the disposition of one or more phases in the microstructure, this term refers to a microstructure having a plurality of thin, elongate, interconnected regions of a phase, typically disposed between other phases.

Measured Amount: An amount of an alloy component (e.g., an element) as determined by evaluating a fabricated object using a suitable technique, such as inductively coupled plasma. In some embodiments, the measured amount of an alloy component may be different from a nominal amount of that alloy component, but typically not by an amount that deleteriously affects the mechanical properties of the fabricated object.

Melt Pool (or Melt Region): As used herein, the terms "melt region" or "melt pool" refer to a region of a fabricated object (or intermediate form thereof) that has been melted (e.g., by exposure to a laser or induction melting) and re-solidified.

Microstructure: The fine structure of an alloy (e.g., grains, cells, dendrites, rods, laths, platelets, precipitates, etc.) that can be visualized and examined with a microscope at a magnification of at least 25×. Microstructure can also include nanostructure (e.g., a structure that can be visualized and examined with more powerful tools, such as electron microscopy, transmission electron microscopy, atomic force microscopy, X-ray computed tomography, etc.).

Minor Alloying Elements: Elements added intentionally to modify the properties of an alloy. Exemplary minor alloying elements can include manganese, silicon, magnesium, iron, zirconium, nickel, scandium, vanadium, titanium, erbium, hafnium, or combinations thereof. If manganese or iron are present as minor alloying elements, they can be included in amounts ranging from 0 wt % to 3 wt % for each alloying element individually. If magnesium, nickel, and/or zirconium are present as minor alloying elements, they can be included in amounts ranging from 0 to 2 wt % for each alloying element individually, such as greater than 0 to 1 wt % or greater than 0 to 0.5 wt %. In embodiments comprising silicon, scandium, vanadium, titanium, erbium, each such minor alloying element is present, individually, in an amount ranging from 0 to 1% or less, such as greater than 0 to 1% or less.

Mischmetal: An alloy of rare earth elements, typically comprising 47-70 wt % cerium and from 25-45 wt % lanthanum. Mischmetal may further include small amounts of neodymium, praseodymium, and/or trace amounts (i.e., less than 1 wt %) of other rare earth elements, and may include small amounts (i.e., up to a total of 15 wt %) of impurities such as Fe or Mg. In some examples, mischmetal comprises 47-70 wt % Ce, 25-40 wt % La, 0.1-7 wt % Pr, 0.1-17 wt % Nd, up to 0.5 wt % Fe, up to 0.2 wt % Si, up to 0.5 wt % Mg, up to 0.02 wt % S, and up to 0.01 wt % P. In certain examples, mischmetal comprises 50 wt % cerium, 25-30 wt % La, with the balance being other rare-earth metals. In one example, mischmetal comprises 50 wt % Ce, 25 wt % La, 15 wt % Nd, and 10 wt % other rare earth metals and/or iron. In an independent example, mischmetal comprises 50 wt % Ce, 25 wt % La, 7 wt % Pr, 3 wt % Nd, and 15 wt % Fe.

Molten: As used herein, a metal is "molten" when the metal has been converted to a liquid form by heating. In some embodiments, the entire amount of metal present may be converted to a liquid or only a portion of the amount of metal present may be converted to liquid (wherein a portion comprises greater than 0% and less than 100% [wt % or vol %] of the amount of metal, such as 90%, 85%, 80%, 70%, 60%, 50%, 40%, 30%, 20%, 10%, 5%, and the like.

Nodular Feature: When used in reference to the microstructure of an alloy, a nodular feature is a microstructural region of a particular chemistry having rounded and irregular boundaries, distinct from surrounding regions of different chemistry.

Nodular Microstructure: When used in reference to the disposition of one or more phases in the microstructure, this term refers to a microstructure having a plurality of nodular features isolated by regions of differing chemistry.

Nominal Amount: An amount of an alloy component (e.g., an element) typically present in a feedstock and/or a feedstock precursor. In some embodiments, the nominal amount of an alloy component may be different from a measured amount of that alloy component, but typically not by an amount that deleteriously affects the mechanical properties of any fabricated object made using the feedstock.

Trace Impurities: Elements that may be found in an alloy embodiment at low levels due to contamination resulting from processing (e.g., from manufacturing materials and/or equipment) and/or present in starting materials used to make an alloy embodiment.

Ultimate Tensile Strength (or Ultimate Tensile Stress): The stress a material can withstand before tensile fracture occurs.

Vickers Hardness: A hardness measurement determined by indenting a test material with a pyramidal indenter, particular to Vickers hardness testing units, that is subjected to a load of 50 to 5000 gf for a period of time and measuring the resulting indent size. Vickers hardness may be expressed in units of HV. In particular disclosed embodiments, the Vickers hardness can be measured by as measured by ASTM method E384.

Yield Strength (or Yield Stress): The stress a material can withstand without permanent deformation; the stress at which a material begins to deform plastically.

II. Introduction

Aluminum alloys have been increasingly used to replace heavier alloys in weight-critical applications, owing to their higher strength-to-weight ratios, specific stiffness, corrosion resistance, and recyclability. Simultaneously, metal additive manufacturing ("AM") has recently emerged as a promising method for producing complex, optimized geometries that cannot be fabricated with conventional manufacturing techniques.

Very few Al alloys, however, have been successfully adopted for additive manufacturing. One major barrier to the adoption of Al alloys is the susceptibility of conventional Al alloy chemistries, initially designed for wrought processing, to hot tearing when exposed to the high cooling rates associated with AM processing. This hot tearing is fundamentally related to the morphology of the "mushy zone," characterized by the formation of networks of FCC—Al dendrites, which inhibit liquid feeding to the regions most at risk of cracking. This vulnerability to hot tearing may be reduced by shortening the temperature range over which an alloy is partially-solidified. Consequently, most additive manufacturing of Al alloys has been done utilizing near-eutectic Al—Si compositions. Unfortunately, these Al—Si compositions do not yield properties that are competitive with commercially-available wrought Al alloys or aerospace grad precipitation hardened alloys. Furthermore, the development of new Al alloy compositions for additive manufacturing has chiefly been limited to modifying existing compositions or by adding grain refiners to reduce hot tearing susceptibility.

Al alloys also have been sought as replacements for Ti alloys for use in moderate temperature applications (e.g., 250-450° C.), but Al alloys currently known in the art lose a large fraction of their strength above approximately 200° C. Consequently, even if existing Al alloy compositions could be modified for use in AM and potentially provide similar properties to wrought products, they are unlikely to enable elevated temperature performance.

Al alloys that would have the highest probability of industrial adoption would provide property sets that cannot be obtained with conventional processing routes. And, if an Al alloy is to be used in AM, it should be amenable to the extreme thermal conditions in additive manufacturing. Such Al alloy embodiments are disclosed herein and exhibit minimal manufacturing defects, a desirable microstructure, mechanical properties at ambient temperature that better (or at least no worse) than current peak-aged wrought alloys, and also retain a high fraction of their strength at high temperatures (e.g., temperatures above 200° C., such as 250° C. to 800° C., or 250° C. to 700° C., or 250° C. to 600° C., or 250° C. to 500° C.). By way of comparison, most wrought alloys are designed for precipitation hardening and their solidification microstructure often includes deep dendritic mushy zones with limited permeability for liquid feeding, enabling cracking near the base of the dendrites. In the solid state, precipitation is a potent strengthening mechanism, but these precipitates easily coarsen or dissolve at elevated temperatures. Also, while near-eutectic alloys can reduce the hot-tear susceptibility by reducing the depth of the mushy zone, they also can produce comparatively coarse microstructures relative to solid-state precipitation, with correspondingly lower strengths.

Al—Sc alloys (commercialized as "Scalmalloy") are known for their use in casting and rapid solidification processes due to their good age hardening by the precipitation of $Al_3Sc$ $L1_2$ particles. While such alloys have recently been adapted for AM, even very small amounts of Sc dramatically increase the cost of these alloys, and the effect of precipitation strengthening still degrades at elevated temperatures. Additionally, Al—Mg—Zr alloys are processable due to the grain refining effect of $Al_3Zr$ primary intermetallic particles that form in the liquid near the melt pool boundaries and, while such alloys display an increase in hardness with aging at 400° C. (likely due to additional precipitation of nano-scale $A_3Zr$ $L1_2$ particles), they begin to decrease in hardness if overaged past approximately 20 hours.

Most Al alloys designed for AM to-date rely on $L1_2$ type precipitates for strengthening and grain refinement, and the limited thermal stability of these particles restricts their use for high-temperature applications. The low solubility of most elements in Al also limits the total volume fraction of $L1_2$ precipitates. As such, there exists a need in the art for Al alloys that can be used in AM methods. The present disclosure describes alloy embodiments that reach a balance between appropriate strengthening mechanisms and manufacturability and microstructure stability at elevated temperatures. The present disclosure is directed to alloy embodiments that are suitable for AM methods, including, but not limited to, layer-by-layer manufacturing methods suitable for metal alloys, such as direct metal laser sintering, direct energy deposition, electron beam melting, selective heat sintering, selective laser melting, selective laser sintering, laser powder bed additive manufacturing, and microinduction. In particular embodiments, the alloy embodiments exhibit properties when processed with rapid solidification techniques. And, the alloy embodiments are suitable for use in AM methods that result in bulk production of alloys.

III. Alloy Embodiments

Alloy embodiments herein can comprise a ternary combination of Al, Ce, and Cu. The Al—Ce—Cu alloy embodiments are specifically designed for additive manufacturing methods and exhibit good strength, retention of strength at high temperatures, and resistance to hot tearing. In some embodiments, the Al—Ce—Cu alloy can comprise Al, Ce, and Cu as the main alloying components and can further comprise other minor alloying elements and/or trace impurities.

Al—Ce—Cu alloy embodiments described herein can comprise Ce in an amount ranging from 1 wt % to 35 wt %, such as 1 wt % (or higher) to 25 wt %, 1 wt % (or higher) to 18%, or 1 wt % (or higher) to 12 wt %, wherein such amounts include nominal and/or measured amounts. In some embodiments, Ce can be present in an amount ranging from more than 2 wt % to 25 wt %, such as 4 wt % to 25 wt %, or 6 wt % to 25 wt %, or 8 wt % to 25 wt %, or 10 wt % to 25 wt %, or 12 wt % to 25 wt %, or 15 wt % to 25 wt %, wherein such amounts include nominal and/or measured amounts. In particular embodiments, Ce can be present in an amount ranging from 4 wt % to 20 wt %, such as 6 wt % to 20 wt %, 8 wt % to 20 wt %, 10 wt % to 20 wt %, 12 wt % to 20 wt %, 14 wt % to 20 wt %, 16 wt % to 20 wt %, or 18 wt % to 20 wt %, wherein such amounts include nominal and/or measured amounts. In other embodiments, Ce can be present in an amount ranging from 6 wt % to 12 wt %, such as 6 wt %, 7 wt %, 8 wt %, 9 wt %, 10 wt %, 11 wt %, or 12 wt %, wherein such amounts include nominal and/or measured amounts. In one representative embodiment, Ce content can be 9 wt %, which can be a nominal and/or measured amount. Al—Ce—Cu alloy embodiments described herein can also comprise Cu ranging from 3 wt % to 35 wt %, such as such as 5 wt % (or higher) to 35 wt %, 10 wt % (or higher) to 35 wt %, 15 wt % (or higher) to 35 wt %, 20 wt % (or higher) to 35 wt %, or 25 wt % (or higher) to 35 wt %, wherein such amounts include nominal and/or measured amounts. In some embodiments, Cu can be present in an amount ranging from more than 4 wt % to 25 wt %, such as 6 wt % to 25 wt %, 8 wt % to 25 wt %, 10 wt % to 25 wt %, 12 wt % to 25 wt %, 14 wt % to 25 wt %, 16 wt % to 25 wt %, 18 wt % to 25 wt %, or 20 wt % to 25 wt %, wherein such amounts include nominal and/or measured amounts. In particular embodiments, Cu can be present in an amount ranging from 6 wt % to 20 wt %, such as 6 wt % to 20 wt %, 8 wt % to 20 wt %, 10 wt % to 20 wt %, 12 wt % to 20 wt %, 14 wt % to 20 wt %, 16 wt % to 20 wt %, or 18 wt % to 20 wt %, wherein such amounts include nominal and/or measured amounts. In other embodiments, Cu can be present in an amount ranging from 5 wt % to 15 wt %, such as 6 wt %, 7 wt %, 8 wt %, 9 wt %, 10 wt %, 11 wt %, 12 wt %, 13 wt %, or 14 wt %, wherein such amounts include nominal and/or measured amounts. In one representative embodiment, Cu content can be 6 wt %, which can be a nominal and/or measured amount. In an independent embodiment, the Cu content is greater than 8 wt %, either nominally and/or as measured. Al—Ce—Cu alloy embodiments disclosed herein can also comprise trace amounts of impurity elements resulting from the feedstock elements or processing conditions. The amount of aluminum present makes up the balance of the alloy composition after the quantity of Ce, Cu, and any minor elements and/or impurities have been accounted for.

In some embodiments, minor alloying elements that can be present in the Al—Ce—Cu alloys disclosed herein include manganese, iron, zirconium, magnesium, nickel, chromium, silicon, scandium, vanadium, titanium, erbium, and hafnium. In some embodiments, the amount of chromium may be 5 wt % or less. In some embodiments, the amount of any manganese or iron is, for each element individually, 3 wt % or less. In some embodiments, the amount of any zirconium, magnesium, or nickel is, for each element individually, 2 wt % or less. In particular embodiments, the amount of silicon is less than 1 wt %. In specific embodiments comprising zirconium, the zirconium may be present in an amount ranging from 0.1 wt % to 1 wt %. In specific embodiments comprising manganese, manganese may be present in amounts ranging from 0.1 wt % to 1 wt %. Al—Ce—Cu alloys disclosed herein may further contain one or more elements which, in aluminum alloys, may form desirable precipitates. In some embodiments, Al—Ce—Cu alloys may comprise vanadium, titanium, hafnium, erbium, or scandium, or a combination thereof wherein each element, individually, is present in an amount ranging from 0 to 1 wt %, such as greater than 0 to 1% or less. Element amounts specified in this paragraph can be nominal and/or measured amounts.

In particular disclosed embodiments, the aluminum alloy consists essentially of aluminum, cerium in an amount ranging from greater than 0 wt % to 35 wt %, copper in an amount ranging from 3 wt % to than 35 wt %, and trace impurities. In an independent embodiment, the aluminum alloy consists of aluminum, cerium in an amount ranging from greater than 0 wt % to 35 wt %, copper in an amount ranging from 3 wt % to than 35 wt %, and trace impurities. In yet additional embodiments, the aluminum alloy consists essentially of cerium in an amount ranging from greater than 0 wt % to 35 wt %, copper in an amount ranging from 3 wt % to than 35 wt %; one or more additional alloying elements selected from manganese in an amount up to 3 wt %, iron up to 3 wt %, magnesium in an amount up to 2 wt %, silicon in an amount up to 1 wt %, nickel in an amount up to 2 wt %, and chromium in an amount up to 5 wt %; and trace impurities. In an independent embodiment, the aluminum alloy consists of cerium in an amount ranging from greater than 0 wt % to 35 wt %, copper in an amount ranging from 3 wt % to than 35 wt %; one or more additional alloying elements selected from manganese in an amount up to 3 wt %, iron up to 3 wt %, magnesium in an amount up to 2 wt %, silicon in an amount up to 1 wt %, nickel in an amount up to 2 wt %, and chromium in an amount up to 5 wt %; and trace impurities. In yet additional embodiments, the aluminum alloy, consists essentially of aluminum, cerium in an amount ranging from greater than 0 wt % to 35 wt %, copper in an amount ranging from 3 wt % to than 35 wt %; one or more precipitate-forming elements selected from zirconium in an amount up to 2 wt %, vanadium in an amount up to 1 wt %, titanium in an amount up to 1 wt %, hafnium in an amount up to 1 wt %, erbium in an amount up to 1 wt %, or scandium in an amount up to 1 wt %; and trace impurities. In an independent embodiment, the aluminum alloy consists of aluminum, cerium in an amount ranging from greater than 0 wt % to 35 wt %, copper in an amount ranging from 3 wt % to than 35 wt %; one or more precipitate-forming elements selected from zirconium in an amount up to 2 wt %, vanadium in an amount up to 1 wt %, titanium in an amount up to 1 wt %, hafnium in an amount up to 1 wt %, erbium in an amount up to 1 wt %, or scandium in an amount up to 1 wt %; and trace impurities. In yet additional embodiments, the aluminum alloy consists essentially of aluminum, cerium in an amount ranging from greater than 0 wt % to 35 wt %, copper in an amount ranging from 3 wt % to than 35 wt %; one or more additional alloying elements selected from manganese in an amount up to 3 wt %, iron in an amount up to 3 wt %, magnesium in an amount up to 2 wt %, silicon in an amount up to 1 wt %, nickel in an amount up to 2 wt %, and chromium in an amount up to 5 wt %; one or more precipitate-forming elements selected from zirconium in an amount up to 2 wt %, vanadium in an amount up to 1 wt %, titanium in an amount up to 1 wt %, hafnium in an amount up to 1 wt %, erbium in an amount up to 1 wt %, or scandium in an amount up to 1 wt %; and trace impurities. In an independent embodiment, the aluminum alloy consists of aluminum, cerium in an amount ranging from greater than 0 wt % to 35 wt %, copper in an amount ranging from 3 wt % to than 35 wt %; one or more additional alloying elements selected from manganese in an amount up to 3 wt %, iron in an amount up to 3 wt %, magnesium in an amount up to 2 wt %, silicon in an amount up to 1 wt %, nickel in an amount up to 2 wt %, and chromium in an amount up to 5 wt %; one or more precipitate-forming elements selected from zirconium in an amount up to 2 wt %, vanadium in an amount up to 1 wt %, titanium in an amount up to 1 wt %, hafnium in an amount up to 1 wt %, erbium in an amount up to 1 wt %, or scandium in an amount up to 1 wt %; and trace impurities. "Consists essentially of" means that the alloy does not include any additional components that affect the measured values for a chemical and/or mechanical property of the alloy by more than 10%, such as 5% to 2%, relative to a comparable alloy that is devoid of the additional components. Element amounts specified in this paragraph can be nominal and/or measured amounts.

Naturally occurring mischmetal may be a less expensive alternative than pure cerium. Natural mischmetal has a variable composition, but typically comprises, in terms of weight percent, 50 wt % cerium, 30 wt % lanthanum, balance other rare earth elements. Thus, in some independent embodiments, cerium component can be obtained using mischmetal rather than pure cerium. In such embodiments, the Al—Ce—Cu alloy can typically further comprise at least some lanthanum.

In yet some additional embodiments, the amount of Ce and Cu included in the alloy can be sufficient to provide a particular microstructure and/or intermetallic phases in the microstructure, particularly at the high cooling rates associated with additive manufacturing processes. In some embodiments, the amount of Ce and Cu present are sufficient to form an $Al_8CeCu_4$ intermetallic phase when the components are fabricated from the alloy under the conditions present in additive manufacturing processes. In other particular embodiments, the amount of Ce and Cu present are sufficient to form an $Al_{10}Cu_7Ce_2$ intermetallic phase under the conditions present in additive manufacturing processes. In yet other embodiments, Ce and Cu are present along with Mn in quantities to form an $Al_{24}Cu_8Ce_3Mn$ intermetallic phase under the conditions present in additive manufacturing processes.

In some particular embodiments, the amount of Ce present in the Al—Ce—Cu alloy can range from 6 wt % to 18 wt %, and the Cu content present in the Al—Ce—Cu alloy can range from 6 wt % to 18 wt %. In one representative embodiment, the alloy may comprise 6 wt % Ce, 6 wt % Cu, and a balance of aluminum. In another representative embodiment, the alloy may comprise 6 wt % Ce, 12 wt % Cu, and a balance of aluminum. In another representative embodiment, the alloy may comprise 6 wt % Ce, 18 wt % Cu, and a balance of aluminum. In another representative embodiment, the alloy may comprise 12 wt % Ce, 6 wt % Cu, and a balance of aluminum. In another representative embodiment, the alloy may comprise 12 wt % Ce, 12 wt % Cu, and a balance of aluminum. In another representative embodiment, the alloy may comprise 12 wt % Ce, 18 wt % Cu, and a balance of aluminum. In another representative embodiment, the alloy may comprise 18 wt % Ce, 6 wt %

Cu, and a balance of aluminum. In another representative embodiment, the alloy may comprise 18 wt % Ce, 12 wt % Cu, and a balance of aluminum. In another representative embodiment, the alloy may comprise 18 wt % Ce, 18 wt % Cu, and a balance of aluminum. In any of the aforementioned embodiments, the Al—Ce—Cu alloy may additionally contain low or trace amounts of Mn, Fe, Zr, Mg, Ni and Si, such as less than 0.1 wt % Mn, less than 0.1 wt % Fe, less than 0.1 wt % Zr, less than 0.1 wt % Mg, less than 0.1 wt % Ni, and less than 0.1 wt % Si. Element amounts specified in this paragraph can be nominal and/or measured amounts.

In one specific embodiment, the Al—Ce—Cu alloy can comprise 9 wt % Ce, 6 wt % Cu, and low or trace amounts of Mn, Fe, Zr, Mg, Ni and Si, such as less than 0.1 wt % Mn, less than 0.1 wt % Fe, less than 0.1 wt % Zr, less than 0.1 wt % Mg, less than 0.1 wt % Ni, and less than 0.1 wt % Si, with the balance made up by aluminum. Element amounts specified in this paragraph can be nominal and/or measured amounts.

In another representative embodiment, the Al—Ce—Cu alloy can comprise 9 wt % Ce, 6 wt % Cu, 1 wt % Zr, and low or trace amounts of Mn, Fe, Mg, Ni, and Si, such as less than 0.1 wt % Mn, less than 0.1 wt % Fe, less than 0.1 wt % Mg, less than 0.1 wt % Ni, and less than 0.1 wt % Si, with the balance made up by aluminum. In embodiments of the Al—Ce—Cu alloy containing Zr, the Zr content may serve to refine the size of the grains formed on the solidification of the alloy. Without being limited to a particular theory, it currently is believed that including the Zr in the Al—Ce—Cu alloys embodied herein increases the number of nucleation sites present as the alloy solidifies from a molten state, causing a greater number of smaller grains to form. Smaller grains offer improved mechanical properties such as ultimate tensile strength and yield strength. Element amounts specified in this paragraph can be nominal and/or measured amounts.

In another representative embodiment, the Al—Ce—Cu alloy can comprise 9 wt % Ce, 6 wt % Cu, 1 wt % Zr, 0.5 wt % Mn, and low or trace amounts of Fe, Mg, Ni, and Si, such as less than 0.1 wt % Fe, less than 0.1 wt % Mg, less than 0.1 wt % Ni, and less than 0.1 wt % Si, with the balance made up by aluminum. In embodiments of the Al—Ce—Cu alloy containing Mn, the Mn may be retained in solution in an aluminum matrix formed upon solidification. Without being limited to a particular theory, it currently is believed that including Mn in the aluminum matrix may enhance the strength of the alloy through solid solution strengthening. Element amounts specified in this paragraph can be nominal and/or measured amounts.

IV. Method Embodiments

Disclosed herein are embodiments of an AM method using the Al—Ce—Cu alloy embodiments disclosed herein. The AM method embodiments described herein can involve layer-by-layer manufacturing methods suitable for metal alloys, such as direct metal laser sintering, direct energy deposition, electron beam melting, selective heat sintering, selective laser melting, selective laser sintering, laser powder bed additive manufacturing and microinduction. Additively manufacturing the Al—Ce—Cu alloy compositions disclosed herein can comprise preparing a powder feedstock, depositing the powder feedstock on a build platform, treating the powder feedstock with an energy source to cause melting and/or sintering, and repeating the deposition and energy treatment processes as necessary to form a desired fabricated object.

Al—Ce—Cu alloy embodiments of the present disclosure can be used in the method and are in the form of a feedstock. In particular embodiments, the feedstock is in the form of a powder or a wire. In some embodiments, the feedstock powder can be made by combining the alloying elements discussed above and producing a cast ingot from the Al—Ce—Cu alloy. The cast ingot can then be atomized under an inert atmosphere to provide the feedstock powder. In some embodiments, the feedstock powder can be sieved to provide a particular size distribution. In representative embodiments described herein the size distribution can range from 1 μm to 200 μm, such as 20 μm to 70 μm, such as 20 μm to 65 μm, or 20 μm to 60 μm. However, other powder particle and/or grain sizes can be made depending on the AM technique to be used. These would be recognized by person of ordinary skill in the art with the guidance of the present disclosure. In yet other embodiments, feedstocks in the form of a wire or other non-powdered form can be used to form the fabricated Al—Ce—Cu alloy embodiments described herein.

The additive manufacturing method for the Al—Ce—Cu alloy embodiments disclosed herein can be carried out using a device, such as a device used in a laser-based additive manufacturing method. The device can include a powder bed, an energy source, a build platform, a deposition apparatus capable of depositing the feedstock (e.g. a roller, a blade, and the like), and other suitable components that will be recognized by a person of ordinary skill in the art with the benefit of the present disclosure. In some embodiments, the method comprises adding a first amount of a feedstock comprising the Al—Ce—Cu alloy to a build platform, exposing the first amount, or a portion thereof, of the feedstock to an energy source to provide a first energy treated region on the build platform; adding a second amount of feedstock to the built platform, wherein the second amount of the feedstock is positioned immediately adjacent to the first energy-treated region on the build platform; and exposing the second amount, or a portion thereof, of the feedstock to the energy source to provide a second energy-treated region on the build platform. In some embodiments, the feedstock is contained in a powder bed that is coupled to the building platform.

The energy source can be a laser or other energy source sufficient to provide enough energy to melt and consolidate the feedstock (e.g., a heater or the like). When exposed to the energy source, the feedstock is sintered and/or melted to provide an energy-treated region (e.g., a consolidated region). This region can be allowed to cool and solidify. The process is repeated to provide sequential layers of energy-treated regions that become fused together during the process, thereby producing the fabricated object. In some embodiments, the method can further comprise preparing a feedstock powder used in embodiments of the method by casting the Al—Ce—Cu alloy into an ingot and atomizing the ingot to provide the feedstock powder. In some embodiments, method parameters can be modified to increase growth velocity, such as by increasing the laser velocity and decreasing the preheat temperature, particularly for laser powder bed fusion additive manufacturing. In yet some additional embodiments, additional heat treatment steps can be performed. In some such embodiments, the additional heat treatment could increase ductility.

V. Fabricated Object Embodiments

The microstructure of fabricated components made from the Al—Ce—Cu alloys and additive manufacturing processes of the present disclosure can comprise an aluminum-based matrix phase and one or more intermetallic phases. In some embodiments, components fabricated from the Al—Ce—Cu alloys disclosed herein may further comprise precipitate phases.

Figure 12A:
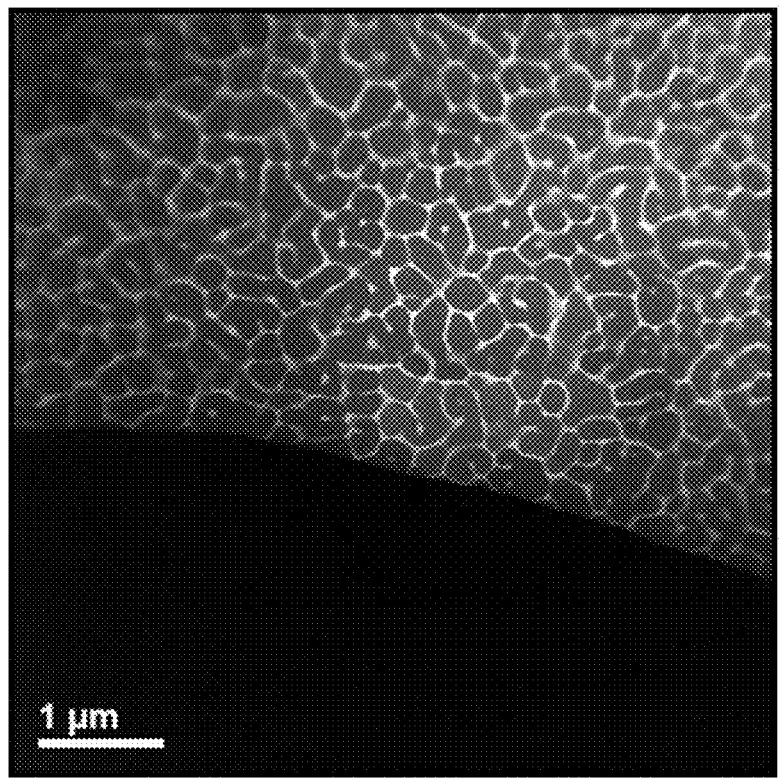
FIGS. 12A-12D show scanning transmission electron microscopy micrographs of an Al—Ce—Cu alloy according to embodiments disclosed herein, wherein dark regions shown are the aluminum matrix phase and bright regions shown are the intermetallic phase.
Figure 14A:
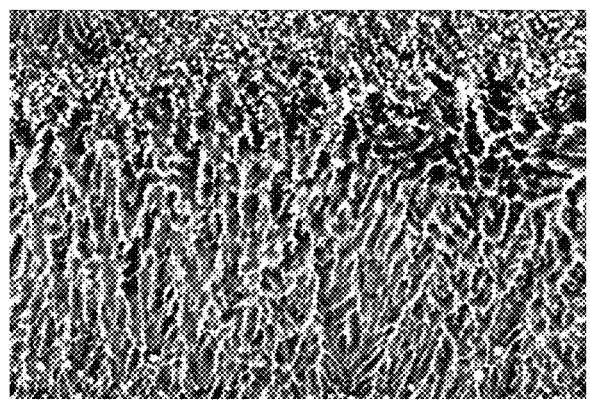
FIG. 14A shows the microstructure of a sample fabricated with a laser travel speed of 2000 mm/s.
Figure 14B:
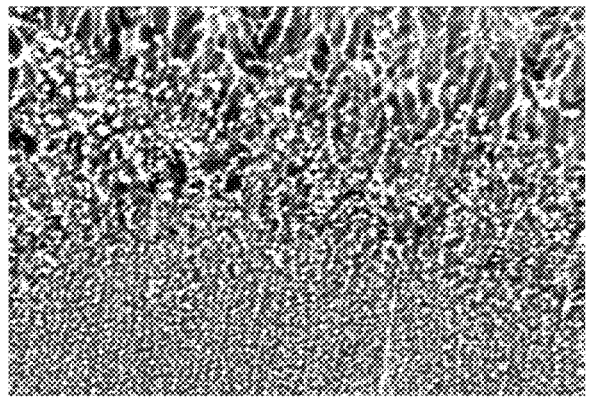
FIG. 14B shows the microstructure of a sample fabricated with a laser travel speed of 3000 mm/s.

In some embodiments the aluminum-based matrix phase is arranged in a cellular structure, with one or more intermetallic phases occupying the space between the aluminum-based matrix features, as shown in FIG. 12A. In some embodiments, the aluminum-based matrix phase can have a dendritic structure, with one or more intermetallic phases occupying the space between the dendrites and/or dendrite arms, as shown in FIGS. 14A and 14B. In yet some additional embodiments, the aluminum-based matrix can have a nodular structure, with one or more intermetallic phases occupying the space between the nodular aluminum regions.

Fabricated components additively manufactured according to the present disclosure and comprising the Al—Ce—Cu alloys disclosed herein may demonstrate a unique morphology and composition of the aluminum matrix phase. In various embodiments, including that shown in FIG. 5C, the aluminum matrix phase can comprise features having an average size between 20 nm and 10 μm in size, such as 50 nm to 1 μm or 200 nm to 500 nm. In some embodiments, the features of the aluminum matrix phase may be cellular features with an average size between 20 nm and 10 μm. In some embodiments, the features of the aluminum matrix phase may be nodular features with an average size between 20 nm and 10 μm.

In some disclosed embodiments, objects fabricated from the Al—Ce—Cu alloy according to the additive manufacturing techniques disclosed herein, the aluminum matrix phase may uniquely comprise additional elements in solid solution. For example, in certain disclosed embodiments, the majority of the Mn content of the Al—Ce—Cu alloy is observed to remain in solution in the aluminum matrix phase. In other disclosed embodiments, zirconium is observed to remain in solution within the aluminum matrix at levels up to three times the equilibrium solid solubility of zirconium in aluminum at ambient temperature. In the various embodiments disclosed herein, the quantity of elements retained in solid solution within the matrix phase may exceed the quantity of elements that would be contained in solid solution under conditions typical of conventional casting processes.

Fabricated components additively manufactured according to the present disclosure and comprising the Al—Ce—Cu alloys disclosed herein further comprise one or more intermetallic phase. In some embodiments, the microstructure of the Al—Ce—Cu alloy comprises an $Al_8CeCu_4$ intermetallic. In some embodiments, the microstructure of the Al—Ce—Cu alloy comprises an $Al_{11}Ce_3$ intermetallic. In some embodiments, the microstructure of the Al—Ce—Cu alloy comprises an $Al_2Cu$ intermetallic. In yet some additional embodiments, the microstructure of the Al—Ce—Cu alloy comprises an $Al_{10}Cu_7Ce_2$ intermetallic. In yet additional embodiments, the presence of manganese in the alloying chemistry can enable the formation of $Al_{24}Cu_8Ce_3Mn$ intermetallics. In yet additional embodiments, more than one of the $Al_8CeCu_4$, $Al_{11}Ce_3$, $Al_2Cu$, $Al_{10}Cu_7Ce$, or $Al_{24}Cu_8Ce_3Mn$ intermetallics are present simultaneously, such as $Al_8CeCu_4$ and $Al_{11}Ce_3$; $Al_8CeCu_4$ and $Al_2Cu$; $Al_8CeCu_4$ and $Al_{10}Cu_7Ce$; $Al_8CeCu_4$ and $Al_{24}Cu_8Ce_3Mn$; $Al_{11}Ce_3$ and $Al_2Cu$; $Al_{11}Ce_3$ and $Al_{10}Cu_7Ce$; $Al_{11}Ce_3$ and $Al_{24}Cu_8Ce_3Mn$; $Al_2Cu$ and $Al_{10}Cu_7Ce$; $Al_2Cu$ and $Al_{24}Cu_8Ce_3Mn$; $Al_{10}Cu_7Ce$ and $Al_{24}Cu_8Ce_3Mn$; $Al_8CeCu_4$, $Al_{11}Ce_3$, and $Al_2Cu$; $Al_8CeCu_4$, $Al_{11}Ce_3$, and $Al_{10}Cu_7Ce$; $Al_8CeCu_4$, $Al_{11}Ce_3$, and $Al_{24}Cu_8Ce_3Mn$; $Al_8CeCu_4$, $Al_2Cu$, and $Al_{10}Cu_7Ce$; $Al_8CeCu_4$, $Al_2Cu$, and $Al_{24}Cu_8Ce_3Mn$; $Al_8CeCu_4$, $Al_{10}Cu_7Ce$, and $Al_{24}Cu_8Ce_3Mn$; $Al_{11}Ce_3$, $Al_2Cu$, and $Al_{10}Cu_7Ce$; $Al_{11}Ce_3$, $Al_2Cu$, and $Al_{24}Cu_8Ce_3Mn$; $Al_{11}Ce_3$, $Al_{10}Cu_7Ce$, and $Al_{24}Cu_8Ce_3Mn$; $Al_2Cu$, $Al_{10}Cu_7Ce$, and $Al_{24}Cu_8Ce_3Mn$; $Al_8CeCu_4$, $Al_{11}Ce_3$, $Al_2Cu$, and $Al_{10}Cu_7Ce$; $Al_8CeCu_4$, $Al_2Cu$, $Al_{10}Cu_7Ce$, and $Al_{24}Cu_8Ce_3Mn$; $Al_8CeCu_4$, $Al_{11}Ce_3$, $Al_{10}Cu_7Ce$, and $Al_{24}Cu_8Ce_3Mn$; $Al_8CeCu_4$, $Al_{11}Ce_3$, $Al_2Cu$, and $Al_{24}Cu_8Ce_3Mn$; $Al_{11}Ce_3$, $Al_2Cu$, $Al_{10}Cu_7Ce$, and $Al_{24}Cu_8Ce_3Mn$; and/or $Al_8CeCu_4$, $Al_{11}Ce_3$, $Al_2Cu$, $Al_{10}Cu_7Ce$, and $Al_{24}Cu_8Ce_3Mn$.

In some disclosed embodiments, the one or more intermetallic phases is disposed in one or more interconnected and/or lattice-like structures that occupies the space between the features of the aluminum-based matrix phase, as illustrated in FIG. 12A. For example, in certain embodiments having a cellular aluminum-based matrix phase, the one or more intermetallic phases can occupy the space between adjacent cells. In other embodiments having a nodular aluminum-based matrix phase, such as the one shown in FIG. 12B, the one or more intermetallic phases can occupy the space between adjacent nodules, and the space between the contours of individual nodules. In embodiments having a dendritic aluminum-based matrix phase, the one or more intermetallic phases can occupy the spaces between adjacent dendrites as well as the spaces between dendrite arms. In such embodiments, the thickness of the intermetallic phase corresponds to the intergranular spacing between aluminum matrix grains and/or the shape of the individual features. The spacing between adjacent features is a distance typically less than 100 nm, such as 10-50 nm, or 20 nm, such that the maximum thickness of an intermetallic phase region is typically 100 nm, such as 10-50 nm, or 20 nm.

In some embodiments, the microstructure of components fabricated from the Al—Ce—Cu alloys disclosed herein via additive manufacturing processes disclosed herein can further comprise precipitate phases. Precipitates may be formed from aluminum and one or more of zirconium, vanadium, titanium, hafnium, erbium, or scandium, and can, in various embodiments be $L1_2$ $Al_3X$ precipitates, where X is selected from zirconium, vanadium, titanium, hafnium, erbium, or scandium. For example, in some embodiments, the component microstructure can comprise $Al_3Zr$ precipitates. In other embodiments the component microstructure can comprise $Al_3V$ precipitates. In still other embodiments, the component microstructure can comprise $Al_3Ti$ precipitates. In other embodiments, the component microstructure can comprise $Al_3Hf$ precipitates. In further embodiments, the component microstructure can comprise $Al_3Er$ precipitates. In yet further embodiments, the component microstructure can comprise $A_3Sc$ precipitates. In still other embodiments, the component microstructure can comprise more than one kind of precipitate selected from $Al_3Zr$, $Al_3V$, $Al_3Ti$, $Al_3Hf$, $Al_3Er$, and $Al_3Sc$.

In some embodiments, an Al—Ce—Cu alloy of the compositions disclosed herein can be modified to reduce or increase the amount of the intermetallic or matrix phases present in the microstructure of a component additively manufactured from the alloy. Solely by way of example, adjusting the alloy chemistry to lower either or both of the Ce or Cu content of the alloy can reduce the quantity of the one or more intermetallic phases and increase the amount of aluminum matrix phase that forms in the microstructure of a component additively manufactured from the Al—Ce—Cu alloy.

In some embodiments, control over the additive manufacturing procedures used during the fabrication of objects out of the Al—Ce—Cu alloys disclosed herein may be exercised to alter the size and distribution of the microstructural features of the fabricated components. For example, the use of a shorter laser dwell time or faster laser traverse speed can produce a microstructure having smaller Al-matrix features and intermetallic phases having a lower thickness than is observed at longer laser dwell times or slower laser traverse speeds.

Fabricated Al—Ce—Cu objects made using the embodiments disclosed herein include microstructures that cannot be obtained using traditional casting methods or other non-AM methods known in the art. In particular disclosed embodiments, the fabricated Al—Ce—Cu alloy objects are components used in the automotive, locomotive, aircraft, and aerospace industries. In some embodiments, the fabricated object is a bulk component. Bulk components are distinct from thin sections made using rapid solidification processes, such as melt spinning. Some exemplary products include, but are not limited to, automotive powertrain components (such as engine pistons, cylinder heads, blocks, water cooled turbocharger manifolds, and other automotive components), aerospace components, heat exchanger components, and any other components requiring aluminum alloys that do not lose structural integrity and/or strength at high temperatures (e.g., temperatures above 200° C.).

VI. Overview of Several Embodiments

Disclosed herein are embodiments of an alloy composition, comprising: 1 wt % to 35 wt % cerium; 3 wt % to 35 wt % copper; 0 wt % to 3 wt % manganese; 0 wt % to 3 wt % iron; 0 wt % to 2 wt % magnesium; 0 wt % to 2 wt % zirconium; 0 wt % to 2 wt % nickel; 0 wt % to 5 wt % chromium; less than 1 wt % silicon; a balance of aluminum; and wherein the amount of cerium and amount of copper present in the alloy composition are sufficient to cause the formation of at least one intermetallic selected from $Al_8CeCu_4$, $Al_{24}Cu_8Ce_3Mn$, $Al_{10}Cu_7Ce_2$, $Al_{11}Ce_3$, or $Al_2Cu$. In some embodiments, the alloy composition (i) does not comprise 3 wt % Ce if 7 wt % Cu is present; and (ii) does not comprise 3 at % Ce if 7 at % Cu is present.

In some embodiments, the alloy further comprises one or more of vanadium, titanium, hafnium, erbium, or scandium in an amount less than 1 wt % for each element taken individually.

In any or all of the above embodiments, the alloy composition comprises an aluminum-based matrix phase with isolated features having an average length of 50 nm to 50 µm; and an intermetallic phase having lattice-like structures between the aluminum-based matrix features, with a thickness ranging from 10 nm to 100 nm.

In any or all of the above embodiments, the cerium is present in an amount ranging from 2 wt % to 25 wt %.

In any or all of the above embodiments, the cerium is present in an amount ranging from 4 wt % to 20 wt %.

In any or all of the above embodiments, the cerium is present in an amount ranging from 5 wt % to 15 wt %.

In any or all of the above embodiments, the copper is present in an amount ranging from 4 wt % to 25 wt %.

In any or all of the above embodiments, the copper is present in an amount ranging from 4 wt % to 20 wt %.

In any or all of the above embodiments, the copper is present in an amount ranging from 5 wt % to 15 wt %.

In any or all of the above embodiments, the zirconium is present in an amount ranging from 0.1 wt % to 1 wt %.

In any or all of the above embodiments, the manganese is present in an amount ranging from 0.1 wt % to 1 wt %.

In any or all of the above embodiments, the alloy composition comprises 9 wt % copper, 6 wt % cerium, and a balance of aluminum.

In any or all of the above embodiments, the alloy composition comprises 9 wt % copper, 6 wt % cerium, between 0.2 wt % and 1.0 wt % zirconium, and a balance of aluminum.

In any or all of the above embodiments, the alloy composition comprises 9 wt % copper, 6 wt % cerium, between 0.2 wt % and 1.0 wt % zirconium, 0.5 wt % manganese, and a balance of aluminum.

Also disclosed herein are embodiments of a fabricated object comprising the alloy composition of the present disclosure, wherein the fabricated object comprises a heterogeneous microstructure having: an aluminum-based matrix phase; and an intermetallic phase, wherein: the aluminum-based matrix phase further comprises isolated features with an average length of 50 nm to 50 µm; and the intermetallic phase further comprises lattice-like structures between the aluminum-based matrix features, with a thickness ranging from 10 nm to 100 nm.

In any or all of the above embodiments, the heterogeneous microstructure comprises one or more regions of columnar grains and one or more regions of equiaxed grains.

In any or all of the above embodiments, the microstructure further comprises a precipitate phase.

In any or all of the above embodiments, the aluminum-based matrix phase further comprises manganese, copper, and/or zirconium in solid solution.

In any or all of the above embodiments, the intermetallic phase comprises at least one of $Al_8CeCu_4$, $Al_{24}Cu_8Ce_3Mn$, $Al_{10}Cu_7Ce_2$, or $Al_2Cu$, or $Al_{11}Ce_3$.

In any or all of the above embodiments, the precipitate phase is one or more of $Al_3Zr$, $Al_3V$, $A_3Ti$, $Al_3Hf$, $Al_3Er$, and $Al_3Sc$.

Also disclosed herein are embodiments of an alloy composition for additive manufacturing, comprising: cerium and copper, wherein the cerium and copper are independently present in an amount sufficient to provide at least one of an $Al_8CeCu_4$, $Al_{24}Cu_8Ce_3Mn$, $Al_{10}Cu_7Ce_2$, $Al_{11}Ce_3$, or $Al_2Cu$ intermetallic phase in an additively manufactured component; trace impurities; and a balance of aluminum.

In some embodiments, the alloy composition for additive manufacturing further comprises one or more additive alloying elements selected from zirconium, manganese, magnesium, iron, silicon, nickel, vanadium, titanium, hafnium, erbium, or scandium.

Also disclosed herein are embodiments of a method, comprising: (a) combining aluminum with (i) copper between 3 wt % and 35 wt %, (ii) cerium between 1 wt % and 35 wt % to form an aluminum-based alloy composition; (b) adding a first amount of feedstock comprising the aluminum-based alloy composition to a build platform; (c) exposing the first amount, or a portion thereof, of the feedstock to an energy source to provide a first energy-treated region on the build platform; (d) adding a second amount of the feedstock to the build platform wherein the second amount of the feedstock is positioned immediately adjacent to the first energy-treated region on the build platform; and (e) exposing the second amount, or a portion thereof, of the feedstock to the energy source to provide a second energy-treated region on the build platform.

In some embodiments, the method further comprises repeating any of steps (b) through (e).

In any or all of the above embodiments, the feedstock is a feedstock powder and the energy source is a laser.

In any or all of the above embodiments, each of the first energy treated region and the second energy treated region comprises a consolidated alloy formed from melting and consolidating particles of the feedstock.

In any or all of the above embodiments, the method is used to make a fabricated bulk component comprising an Al—Ce—Cu alloy and comprising a heterogenous microstructure.

In any or all of the above embodiments, step (a) further comprises adding at least one of zirconium, magnesium, or nickel in an amount less than or equal to 2 wt % each.

In any or all of the above embodiments, step (a) further comprises adding at least one of manganese or iron in an amount less than or equal to 3 wt % each.

In any or all of the above embodiments, step (a) further includes adding at least one of vanadium, titanium, hafnium, erbium, scandium, or chromium.

In any or all of the above embodiments, step (a) further comprises (i) adding chromium in an amount less than or equal to 5 wt %; (ii) adding at least one of manganese or iron in an amount less than or equal to 3 wt % for each element taken individually; (iii) adding at least one of zirconium, magnesium, or nickel in an amount less than or equal to 2 wt % for each element taken individually; (iv) adding at least one of adding at least one of vanadium, titanium, hafnium, erbium, or scandium in an amount less than or equal to 1 wt % for each element taken individually; or any combination of (i), (ii), (iii) and/or (iv).

VII. Examples

Heat Treatment, Hardness, and Mechanical Testing—With reference to the examples discussed herein, mechanical testing and microstructural characterization is performed on as-fabricated samples at various test temperatures, as well as following long term thermal exposure. Mechanical test coupons are machined from printed coupons according to the ASTM E8 standard with a 0.25 in. gage diameter. For mechanical testing at elevated temperatures ranging from 150 to 400° C., a temperature ramp rate of 10° C./min is applied, and samples are held at temperature for 30 minutes prior to testing to allow for thermal equilibration. Additional samples are pre-conditioned for 200 hours at 400° C. using a resistance furnace, and then tested at the same temperature. As-atomized powder samples are also pre-conditioned using the same procedure for characterization by X-ray diffraction. Vickers hardness testing is performed on both as-fabricated and thermally exposed samples. To achieve a representative sampling of the microstructure, a 5 kg load with a 10 s dwell time is used, and measurements are averaged over 5 indents. Smaller indentations, using a 100 g load with a 13 s dwell time, are also used to locally probe microstructural regions. In this case, data are averaged over 10 indents.

Microscopy and X-ray Diffraction—Microstructures are first characterized by scanning electron microscopy (SEM) using both a Hitachi S-4800 Field Emission Gun (FEG)-SEM and Zeiss EVO LS15 on samples tested and heat treated at the temperatures listed above. Elemental distribution is mapped by energy dispersive spectroscopy (EDS) methods in the Hitachi S-4800. X-ray diffraction (XRD) data are collected on the gas atomized metal powder and additively manufactured samples in the as-fabricated and thermally exposed conditions using a PANalytical Empyrean instrument configured with a Bragg-Brentano geometry. Cu-Kα radiation is used (45 kV and 40 mA) and incident and diffracted beam optics included programmable divergent slits, anti-scattering slits and a PIXcel detector. Data are collected between 15 and 120 degrees 2θ with a step size of 0.026 degrees and a dwell time of 100 s. Aberration-corrected scanning transmission electron microscopy (AC-STEM) are also used to characterize the microstructure of the as-fabricated and thermally exposed material. Disks, 3 mm in diameter, are prepared by grinding and electropolishing using a Struers A/S TenuPol dual-jet electropolisher. The foils are then characterized using a JEOL 2200FS microscope outfitted with a CEOS GmbH aberration corrector. The instrument is also used to collect STEM-EDS spectra.

Computations—Computer coupling of phase diagrams and thermo-chemistry, i.e., the CALPHAD approach is used to aid understanding of the as-solidified and thermally exposed microstructure. In this approach, the Gibbs energy of individual phases is modeled based on crystal structure, defect type and phase chemistry. The model parameters are obtained through a procedure that aims at reproducing the experimentally assessed phase equilibria and thermodynamic properties by the model-calculated ones. The thermodynamic database, i.e., a compilation of Gibbs energy functions of individual phases, is modeled in sequence from unary, binary and ternary. The Gibbs energy functions of the three unary systems Al, Ce and Cu is adopted from the SGTE (Scientific Group Thermodata Europe) database compiled by Dinsdale. The Gibbs energy functions of phases in the three constituent binaries is adopted from Al—Cu, Al—Ce, and Ce—Cu energy functions. The Gibbs energy functions of phases in the Al-rich region of the Al—Ce—Cu system is obtained using thermodynamic modeling of an alloy embodiment according to the present disclosure.

Example 1

In this example, Al—Ce—Cu alloys with nominal compositions as shown in Table 1 were produced by alloying in a gas fired furnace in a 250 g SiC crucible using Argon as the cover gas. Alloying elements were certified to at least 99.6% purity. Impurity content of silicon was less than 0.10%, and iron less than 0.15%. Cast ingots were then Nitrogen atomized (Argon was used as the initial melt cover gas). The resulting powder was sieved for a 20-63 μm size distribution. Additive manufacturing was performed using a Concept Laser M2 laser powder bed fusion system.

TABLE 1

Nominal Composition of the Tested Alloys. All values given in wt. %.

| Alloy | Al | Ce | Cu | Zr | Mn |
|---|---|---|---|---|---|
| 1 | Balance | 6 | 9 | — | — |
| 2 | Balance | 6 | 9 | 1 | — |
| 3 | Balance | 6 | 9 | 1 | 0.45 |

The actual composition of alloy 1 was then measured using inductively coupled plasma. Results are shown in Table 2.

TABLE 2

Actual Composition of Alloy 1 Samples. All values given in wt. %.

| Element | Al | Cu | Ce | Fe | Si |
|---|---|---|---|---|---|
| Concentration | 87.2 | 7.78 | 4.73 | 0.11 | 0.07 |

Example 2

In this example, the possible nature and identities of the intermetallic phases present in an alloy of nominal composition of Al-9Cu-6Ce. X-ray diffraction was used to identify potential intermetallic phases in the tested samples. X-ray diffraction (XRD) data were collected on the gas atomized metal powder and additively manufactured samples in the as-fabricated and thermally exposed conditions using a PANalytical Empyrean instrument configured with a Bragg-Brentano geometry. Cu-Kα radiation was used (45 kV and 40 mA) and incident and diffracted beam optics included programmable divergent slits, anti-scattering slits and a PIXcel detector. FIG. 1 shows the XRD data from the Al-9Cu-6Ce sample plotted with known peak locations for Al, $Al_{10}Cu_7Ce_2$, $Al_{11}Ce_3$, $Al_{24}Cu_8Ce_3Mn$, and $Al_2Ce$. Note that the potential presence of $Al_{24}Cu_8Ce_3Mn$ may indicate the presence of Mn impurities in the sample.

Example 3

In this example, the composition of the matrix and intermetallic phases was studied using Atom Probe Tomography (APT). APT is an atomic resolution level characterization technique that allows for compositional analysis of different phases and/or regions of an alloy sample. APT specimens were prepared according to the following methodology. Wedges were lifted out, mounted on Si microtip array posts, sharpened using a 30 kV Ga+ ion beam, and cleaned using a 2 kV Ga+ ion beam. APT experiments were run using a CAMECA LEAP 4000xHR in voltage and laser modes with a 25-70K base temperature, 30% pulse fraction (voltage mode), laser energy of 35 pJ (laser mode), detection rate of 0.25-0.5%, and a 200 kHz pulse repetition rate. The APT results were reconstructed and analyzed using CAMECA's interactive visualization and analysis software (IVAS 3.8). Compositions of the precipitate phases and matrix were extracted from the plateau regions of proximity histograms.

Figure 2:
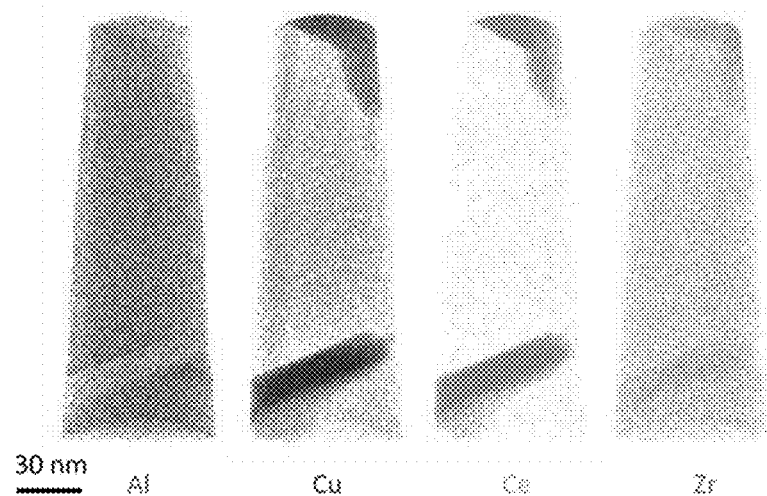
FIG. 2 is a plot of atom probe tomography results from an Al—Ce—Cu—Zr alloy according to embodiments herein, showing the relative concentrations of aluminum, copper, cerium, and zirconium in the aluminum matrix and intermetallic phases.
Figure 3:
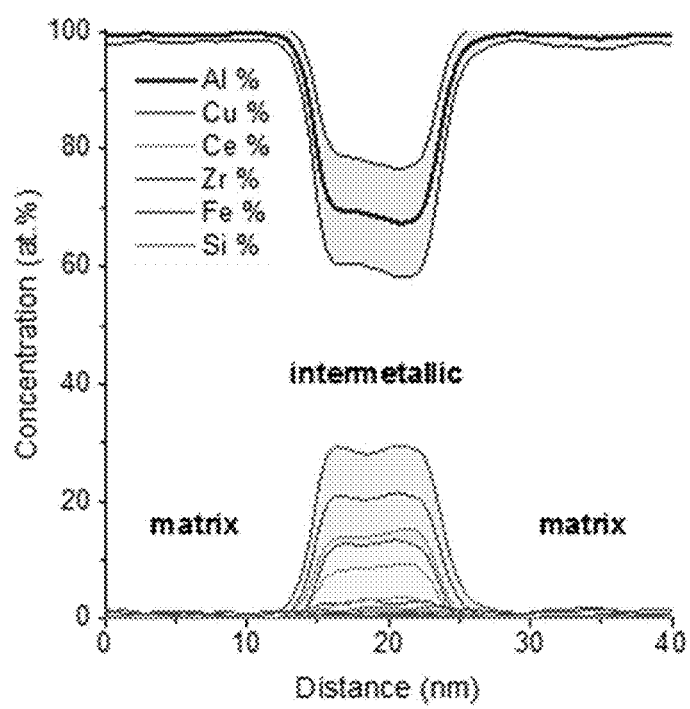
FIG. 3 is a plot of the atomic concentrations of alloy elements Al, Ce, Cu, and Zr, as well as impurity level Fe and Si content from the atom probe tomography results of FIG. 2, shown in atomic percent.

APT samples were prepared for an Al—Ce—Cu alloy having a nominal composition of Al-6Ce-9Cu-1Zr. Results are shown in FIG. 2. FIG. 2 shows an aluminum matrix center region having Cu and Zr content in solid solution, and intermetallic phases comprising elevated levels of Ce, Cu, and Zr. FIG. 3 shows the concentrations of alloy elements Al, Ce, Cu, and Zr, as well as impurity elements Fe and Si, in atomic percent.

Example 4

Figure 4:
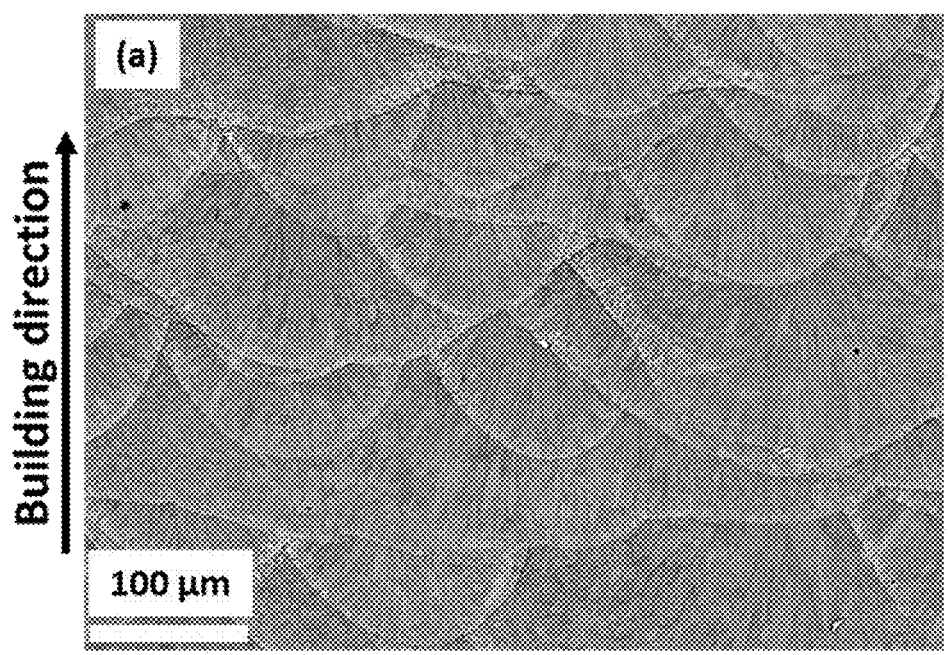
FIG. 4 is a representative micrograph showing the plurality of melt pool regions and melt pool boundaries of a component fabricated according to the additive manufacturing techniques disclosed herein.

Samples of the Al—Ce—Cu alloy embodiments according to the nominal compositions shown in Table 1 above, in the as-fabricated conditions were prepared. FIG. 4 shows an exemplary embodiment of a component fabricated from an Al—Ce—Cu alloy disclosed herein according to additive manufacturing processes disclosed herein, in the as-fabricated condition. The sample as shown in FIG. 4 shows a series of lens-shaped melt volumes. In between each melt volume is a melt pool boundary (MPB). These MPB areas represent previously-solidified material that has been reheated during the addition of subsequent layers of additively-manufactured material.

Figure 5A:
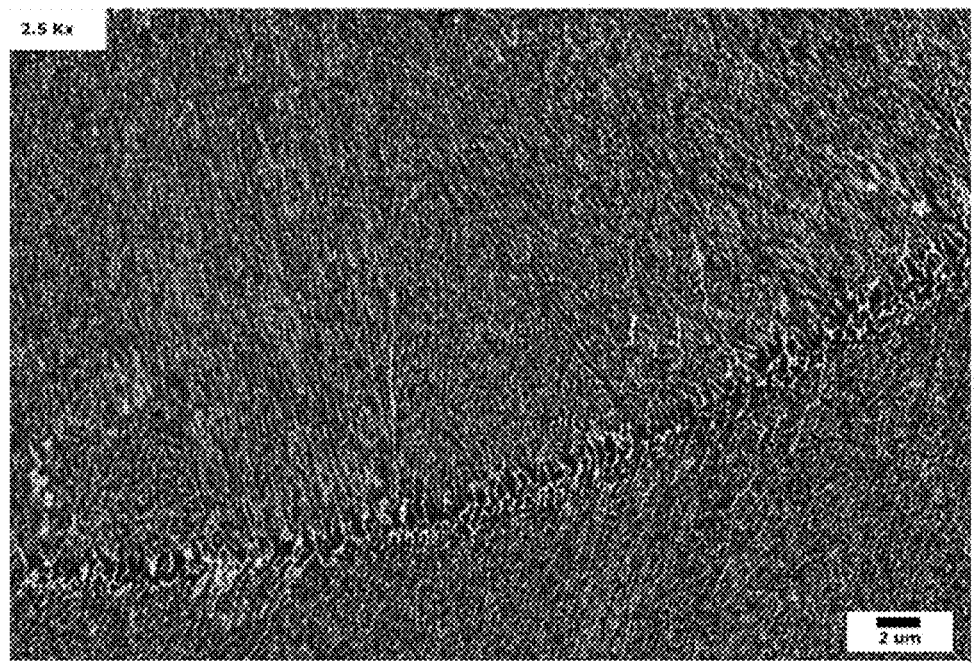
FIGS. 5A-5C are scanning electron microscope micrographs of as-fabricated samples of an Al—Ce—Cu alloy according to embodiments disclosed herein, wherein a top melt pool region, a bottom melt pool region, and a melt pool boundary area are shown.
Figure 5B:
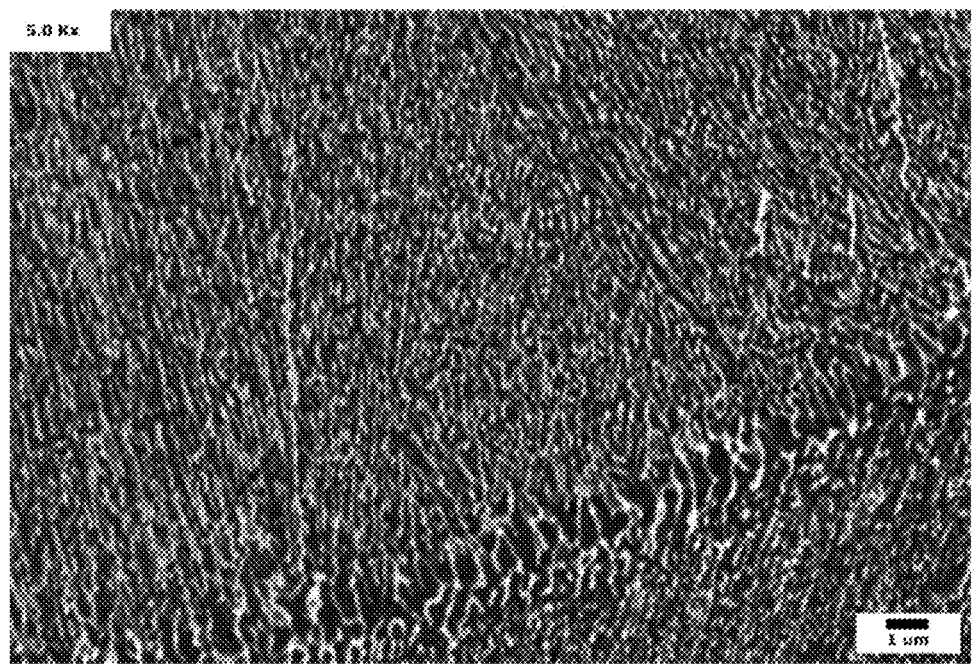
Figure 5C:
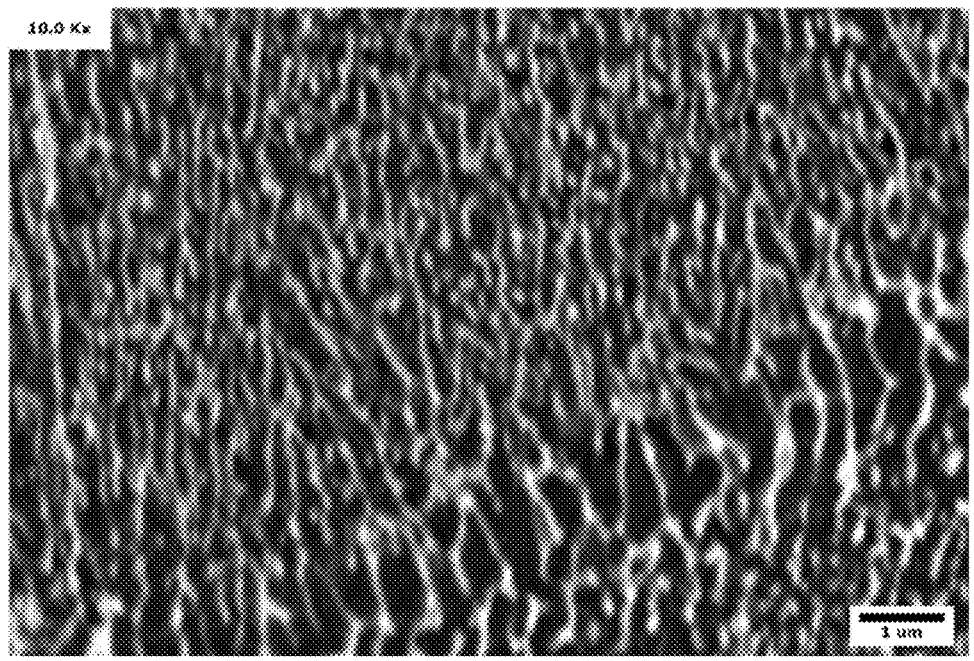

FIGS. 5A through 5C show the microstructure of an as-fabricated alloy with a nominal composition of Al-6Ce-9Cu at magnifications of 2500×, 5000×, and 10000× respectively. FIG. 5A shows the heterogenous microstructure of the component in the as-fabricated position. Shown are a top melt volume and a bottom melt volume separated by a melt pool boundary (MPB). The top melt volume and bottom melt volume are characterized by a very fine microstructure with dark aluminum matrix regions and bright intermetallic regions, with coarser regions visible at the MPB. FIGS. 5B and 5C show a higher magnification view of the region near the MPB, illustrating a coarsened aluminum matrix structure.

Figure 6A:
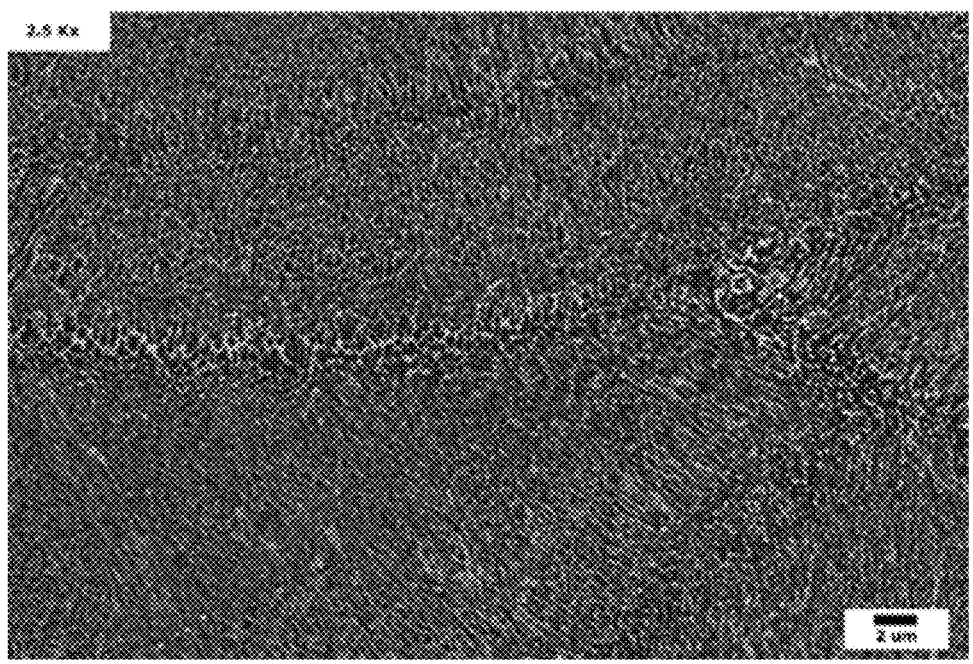
FIGS. 6A-6C are scanning electron microscope micrographs of as-fabricated samples of an Al—Ce—Cu—Zr alloy according to embodiments disclosed herein, wherein a top melt pool region, a bottom melt pool region, and a melt pool boundary area are shown.
Figure 6B:
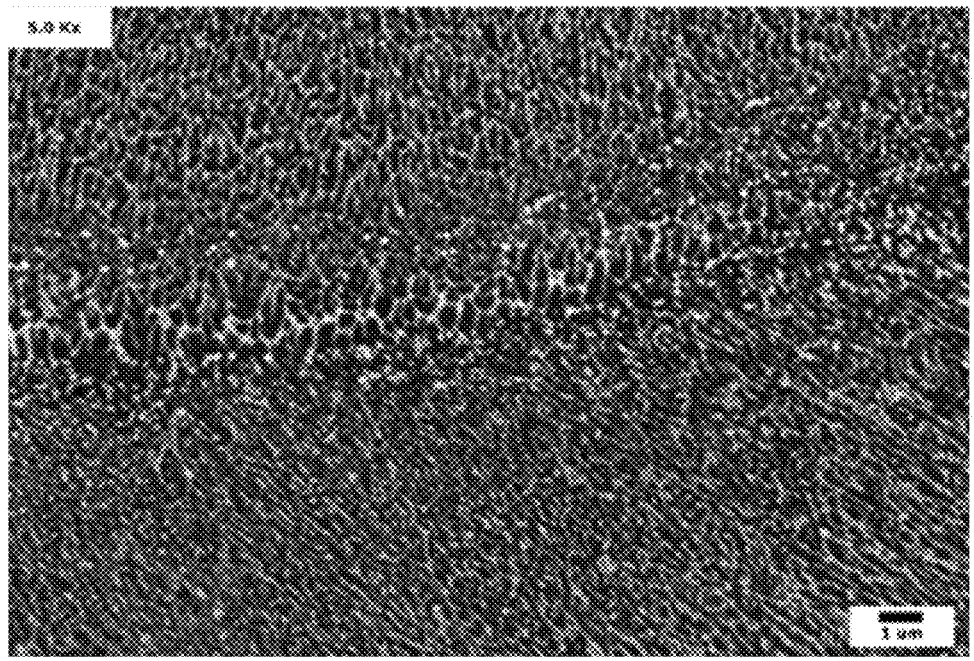
Figure 6C:
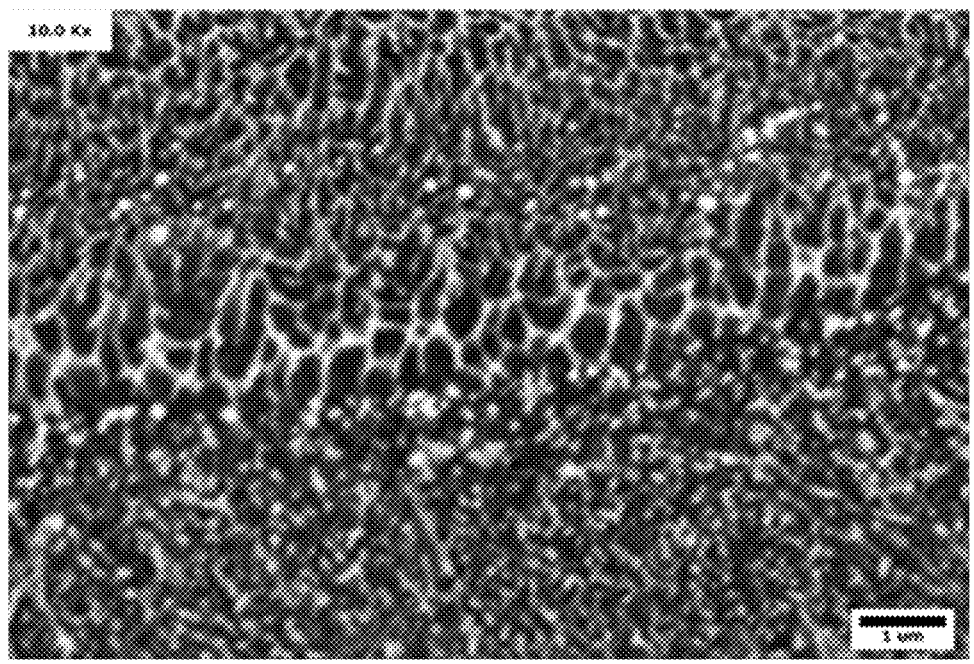

FIGS. 6A-6C show the microstructure of an as-fabricated alloy with a nominal composition of Al-6Ce-9Cu at magnifications of 2500×, 5000×, and 10000× respectively. FIG. 6A shows the heterogenous microstructure of the component in the as-fabricated position. Shown are a top melt volume and a bottom melt volume separated by a melt pool boundary (MPB). The top melt volume and bottom melt volume are characterized by a very fine microstructure with dark aluminum matrix regions and bright intermetallic regions, with coarser regions visible at the MPB. FIGS. 6B and 6C show a higher magnification view of the region near the MPB, illustrating a coarsened aluminum matrix structure.

Figure 7A:
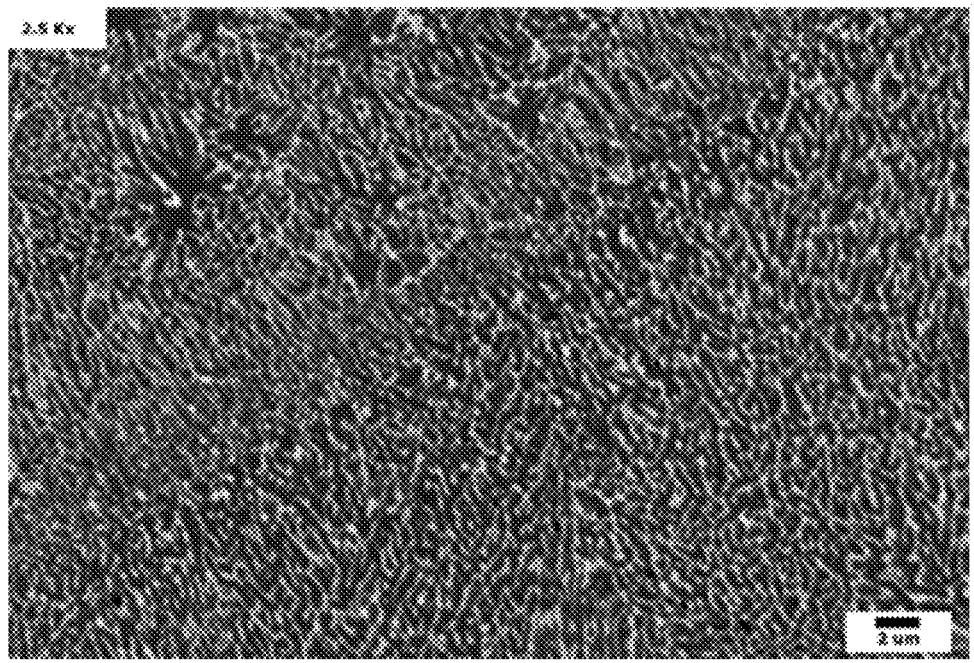
FIGS. 7A-7C are scanning electron microscope micrographs of as-fabricated samples of an Al—Ce—Cu—Zr—Mn alloy according to the embodiments disclosed herein, wherein are a top melt pool region, a bottom melt pool region, and a melt pool boundary area are shown.
Figure 7B:
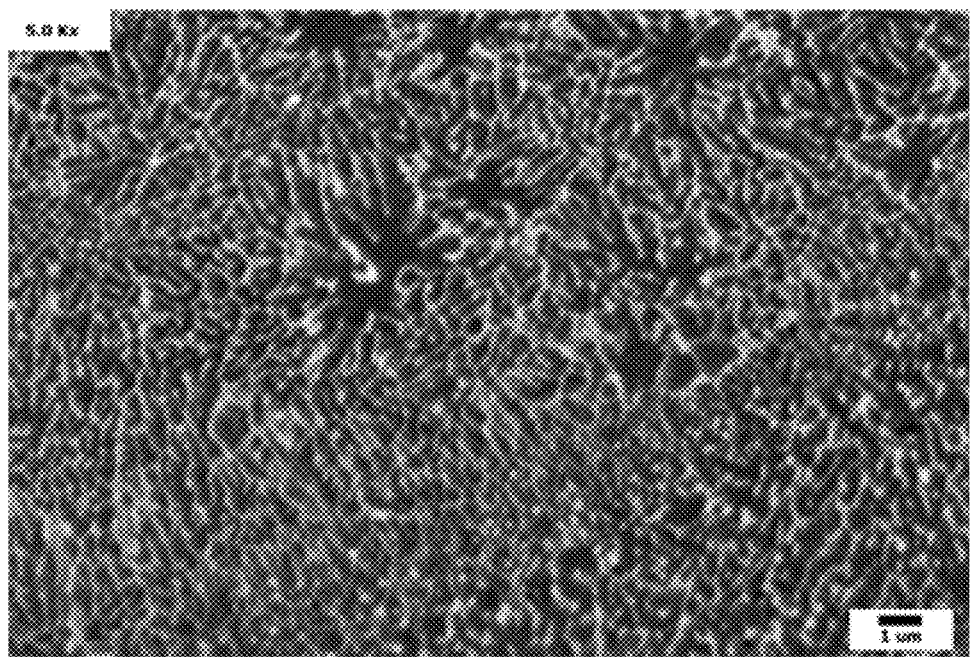
Figure 7C:
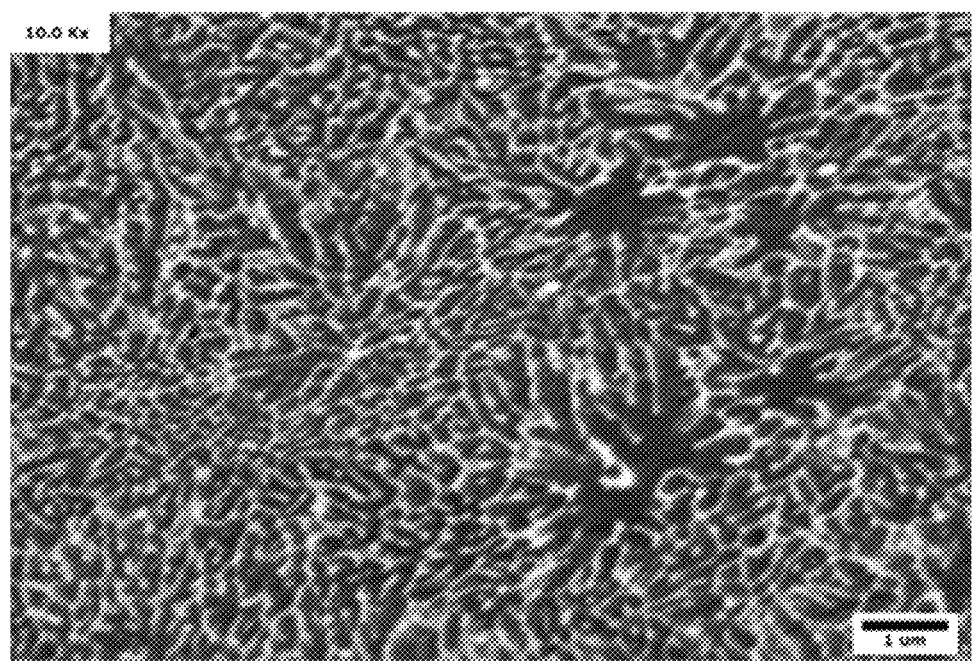

FIGS. 7A through 7C show the microstructure of an as-fabricated alloy with a nominal composition of Al-6Ce-9Cu-1Zr-0.5Mn at magnifications of 2500×, 5000×, and 10000× respectively. FIG. 7A shows the heterogenous microstructure of the component in the as-fabricated position. Shown are a top melt volume and a bottom melt volume separated by a melt pool boundary (MPB). The top melt volume and bottom melt volume are characterized by a very fine microstructure with dark aluminum matrix regions and bright intermetallic regions, with coarser regions visible at the MPB. FIG. 7B shows a higher magnification view of the region near the MPB, illustrating somewhat coarsened aluminum matrix features. Also shown in the top melt volume are several rosette or star shaped aluminum matrix features. FIG. 7C shows a higher magnification view of top melt volume and the rosette or star shaped aluminum matrix features therein.

Example 5

Figure 8A:
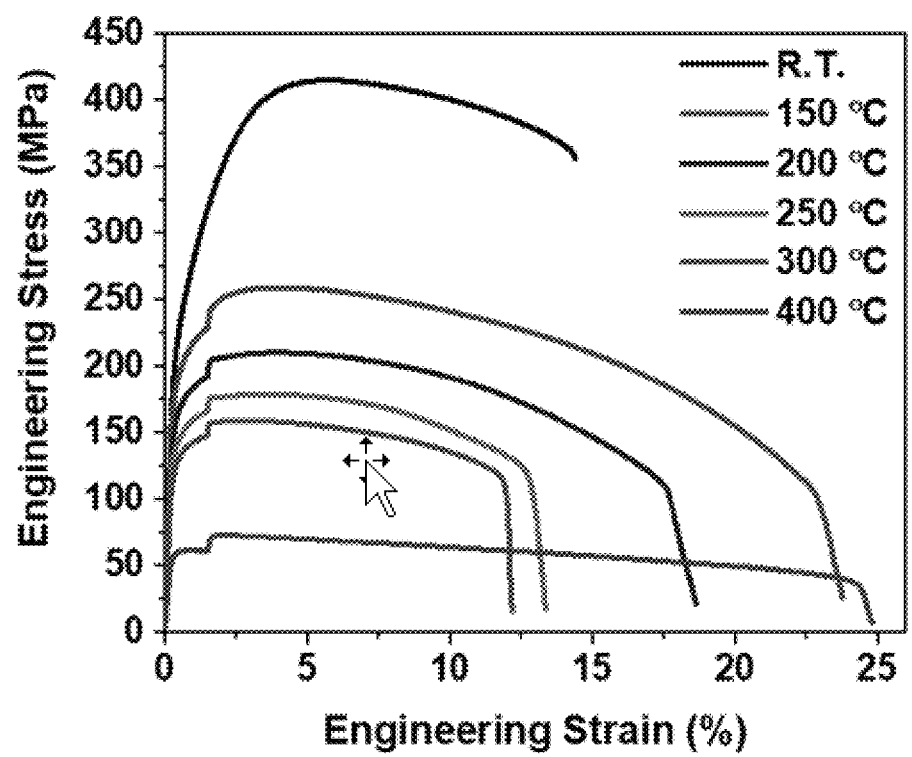
Figure 8B:
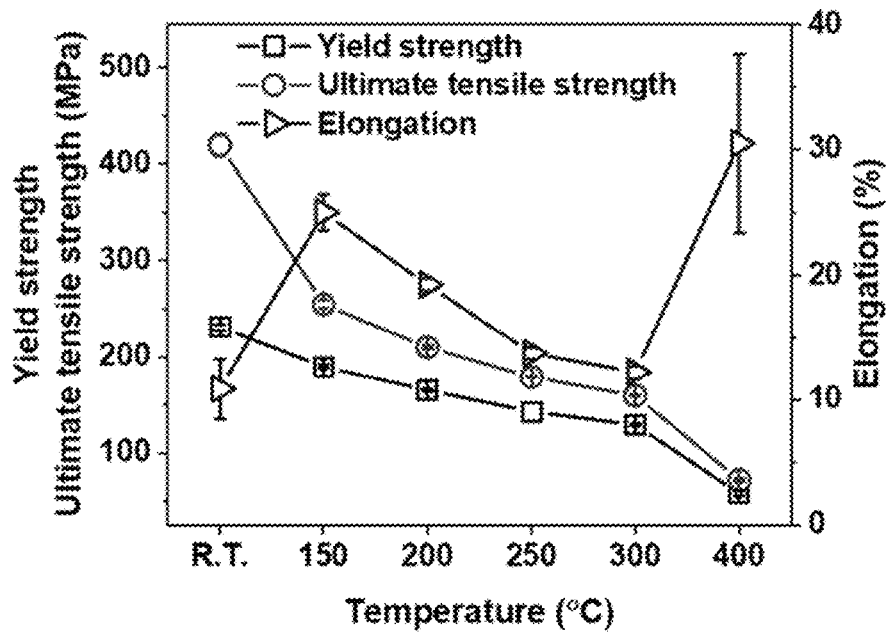

Mechanical properties of as-fabricated Al-6Ce-9Cu alloy at ambient temperature (R.T.) and elevated temperature (150, 200, 250, 300, and 400° C.) were characterized with tension and compression tests. Tensile specimens with 6.35 mm gauge dimeter and 25.4 mm gauge length were machined such that the build direction was parallel to tensile loading axis. Tensile tests were conducted per the ASTM E8 and E21 standards for R.T. and elevated temperature, respectively. The initial strain rate was approximately 10−4 s−1 and subsequently increased to 10−3 s−1 beyond 1.5% strain for elevated temperature tests only. Four specimens were tested for each temperature. FIG. 8A shows the tensile test curves for the fabricated samples at various test temperatures. FIG. 8B provides a summary of the yield stress, ultimate tensile strength, and total elongation for the fabricated Al-6Ce-9Cu samples at various test temperatures.

Stress rate sensitivity (SRS) at each temperature was measured by compression test of cylindrical specimens 10 mm diameter and 15 mm height, machined with build direction parallel to compression loading axis. Compression tests were done at 10−4, 10−3, and 10−1 s−1 constant true strain rates with one specimen tested for each temperature and strain rate combination. A 30 min soak time was given at the test temperature prior to tension and compression tests. Strains during tension and compression tests were measured with axial extensometers. SRS at a fixed true strain (ε) as defined by the following equation:

$$m = \frac{d(\ln\sigma)}{d(\ln\dot{\varepsilon})}\bigg|_\varepsilon$$

Figure 9:
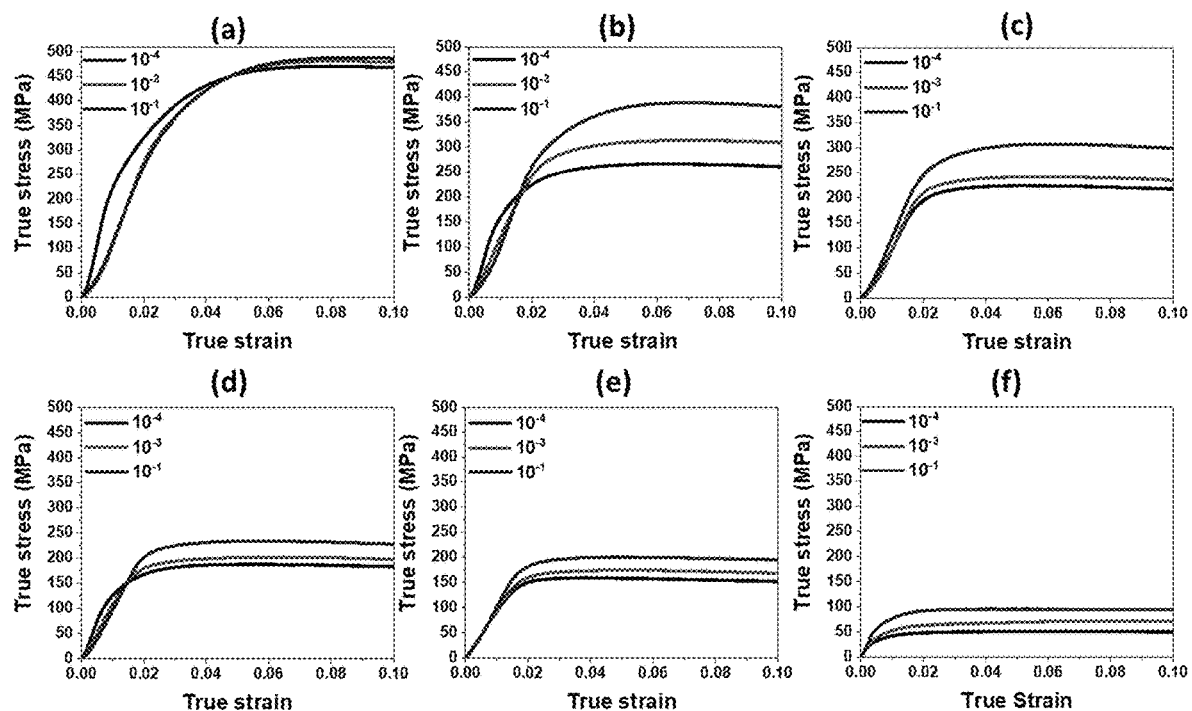
FIG. 9 shows engineering stress strain plots for samples of an Al—Ce—Cu alloy according to embodiments disclosed herein, wherein the plots show data from true strain=0.0 to true strain=0.10. Tests were performed at a) ambient temperature; b) 150° C.; c) 200° C.; d) 250° C.; e) 300° C.; and f) 400° C. At each temperature, tests were conducted at strain rates of $10^{-4}$, $10^{-2}$, and $10^{-1}$.
Figure 10:
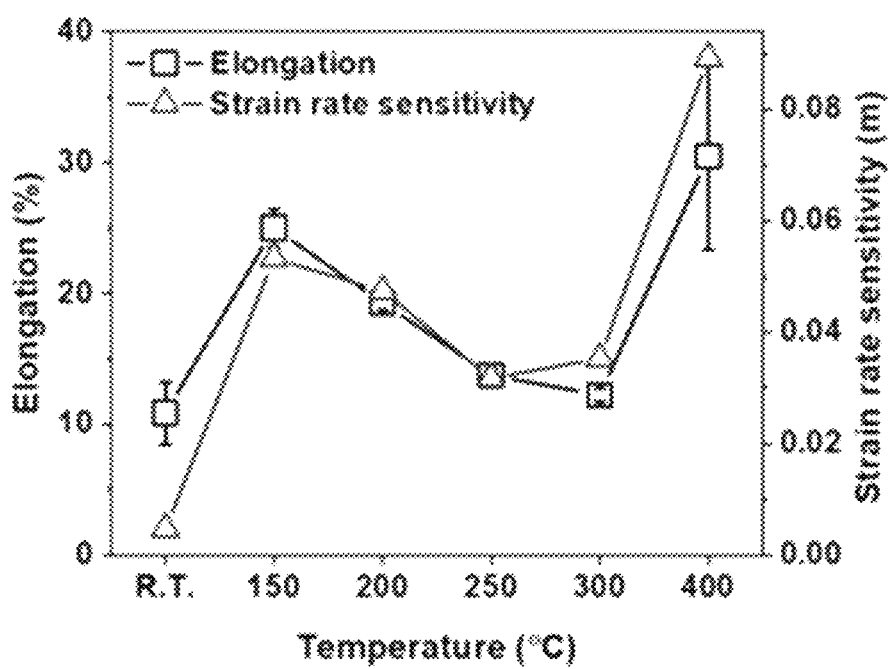
FIG. 10 shows the calculated strain rate sensitivity and measured maximum elongation for an Al—Ce—Cu alloy according to embodiments disclosed herein, wherein strain rate sensitivity data was computed using the results shown in FIG. 9.

FIG. 9 shows the true strain of SRS samples tested at (a) R.T., (b) 150° C., (c) 200° C., (d) 250° C., (e) 300° C., and (f) 400° C., demonstrating the response of the tensile curves to varying strain rates. FIG. 10 shows the total tensile elongation and calculated SRS at the tested temperatures.

Example 6

In this example, test coupons of the alloy compositions shown in Table 1 were manufactured with a Concept Laser M2 LPBF system. Tensile tests were performed on coupons in the as-fabricated condition for all three alloy compositions. Tensile tests were also performed on samples manufactured from compositions 2 and 3 following Hot Isostatic Pressing ("HIP") at 400° C., 200 MPa for 6 hours. Tests were conducted at sample temperatures of ambient temperature, 150° C., 200° C., 250° C., 300° C., and 400° C.

Figure 11:
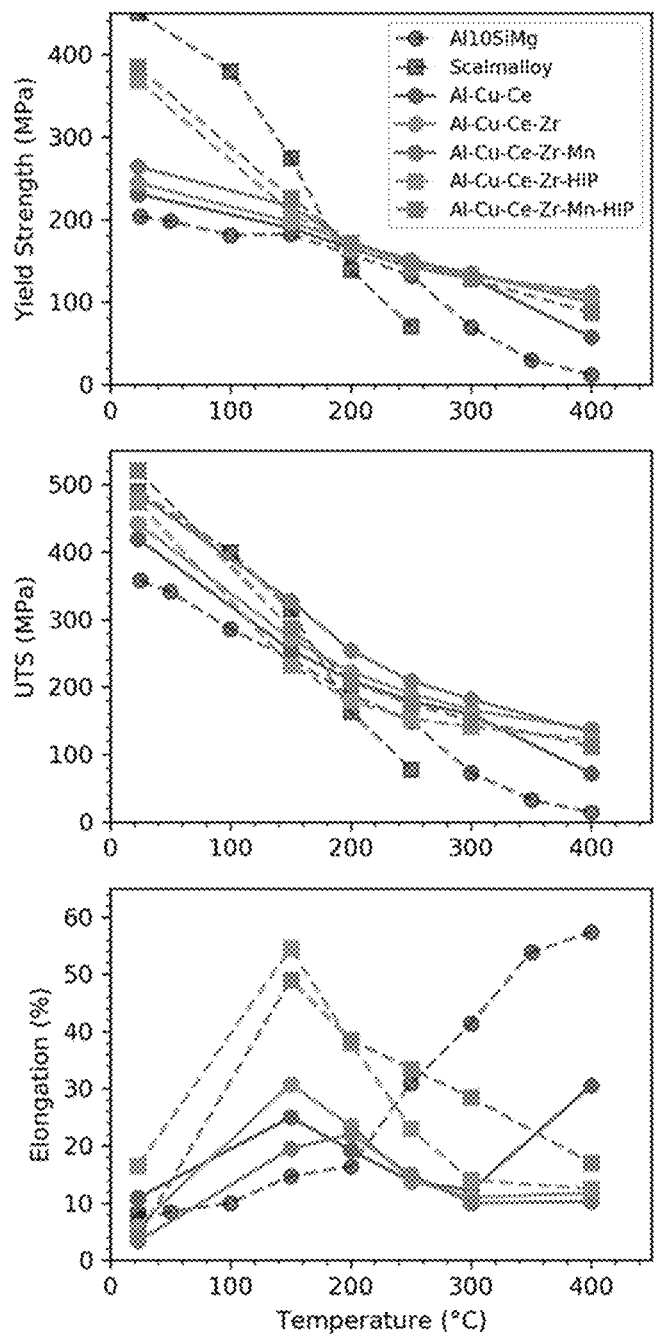
FIG. 11 shows the compared yield strength, ultimate tensile strength, and elongation data for Al—Ce—Cu, Al—Ce—Cu—Zr, and Al—Ce—Cu—Zr alloys according to embodiments disclosed herein, wherein the data was measured at ambient temperature, 150° C., 200° C., 250° C., 300° C., and 400° C. and plotted in comparison to conventional Al-10Si—Mg and Scalmalloy data.

The results of the mechanical testing are summarized in FIG. 11. The mechanical test results are compared to Al10SiMg and Scalmalloy mechanical properties. HIP processing of alloys 2 and 3 greatly increases ambient temperature yield strength. Without being limited to a particular theory, it currently is believed that this increase in yield strength is due to nucleation of Zr precipitates, which also provides a slight increase in ultimate tensile strength of those alloys. All three alloys demonstrate ambient temperature mechanical yield strength and ultimate tensile strength superior to that of Al10SiMg, but comparable to or slightly below that of Scalmalloy. However, all three alloys retain much larger portions of their yield strength and ultimate tensile strength at elevated temperatures.

Example 7

In this example, samples were prepared of alloys 1 and 2 listed Table 1. Aberration-corrected scanning transmission electron microscopy (AC-STEM) was used to characterize the microstructure of the material. Disks, 3 mm in diameter, were prepared by grinding and electropolishing using a Struers A/S TenuPol dual-jet electropolisher. The foils were then characterized using a JEOL 2200FS microscope outfitted with a CEOS GmbH aberration corrector.

Figure 12B:
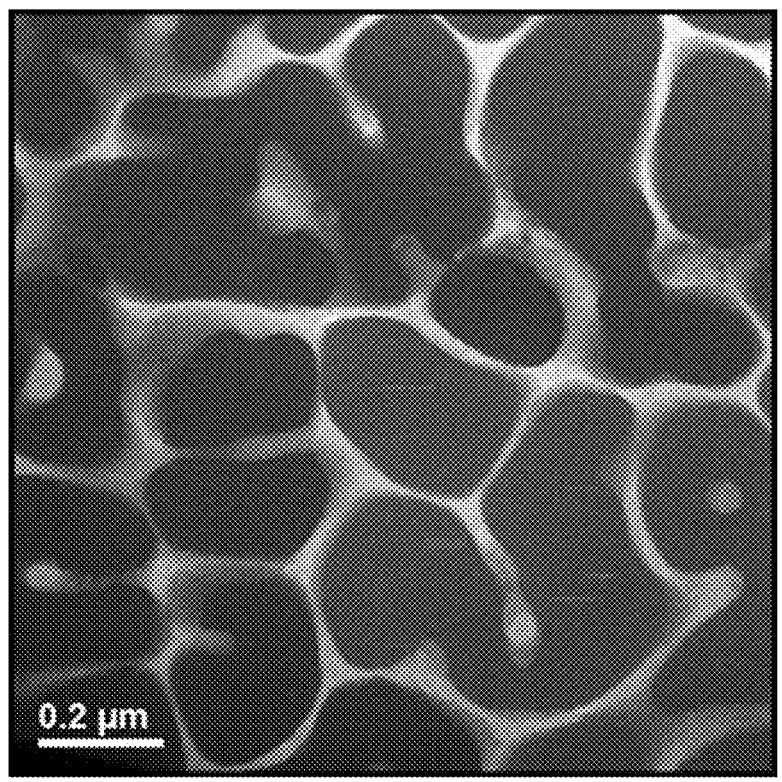
Figure 12C:
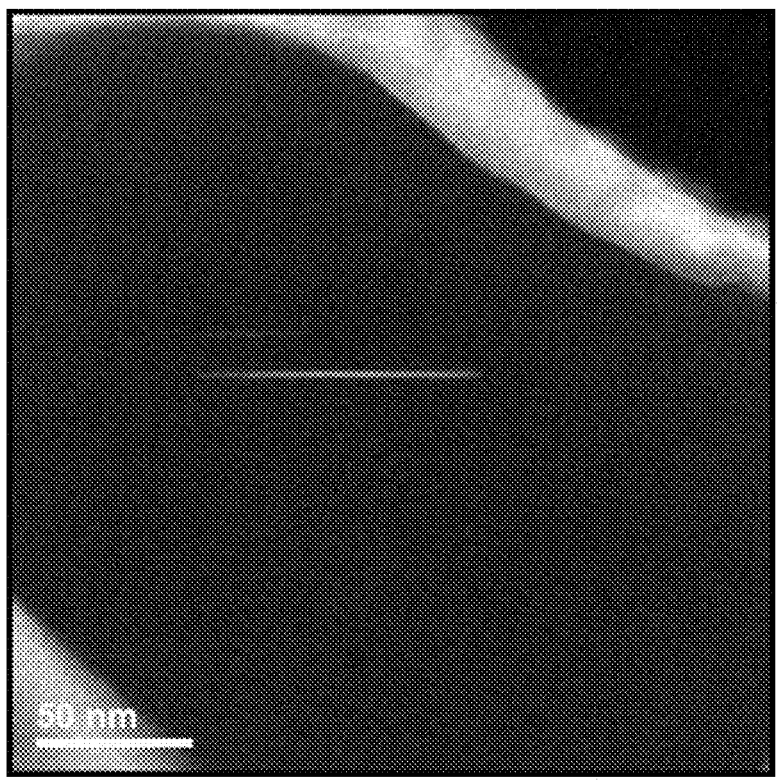
Figure 12D:
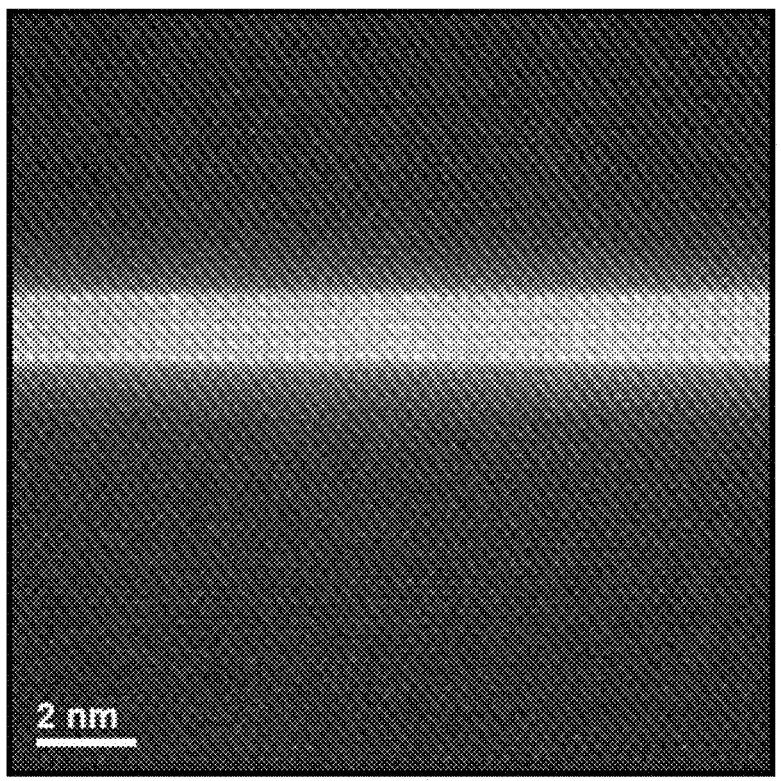

FIGS. 12A through 12D show the microstructure of the Al-6Ce-9Cu alloy. The aluminum matrix phase of the Al-6Ce-9Cu alloy as dark, cellular or nodular regions. The intermetallic phase of the Al-6Ce-9Cu alloy is shown as the lattice-like bright region separating individual cells or nodules of the aluminum matrix. FIG. 12A shows a relatively uniform microstructure having irregularly-shaped aluminum matrix cells of up to about 1 μm in size and an intermetallic phase 10 nm to 50 nm thick separating the aluminum matrix cells. FIG. 12B shows the same structures at higher magnification, and also reveals the presence of plate- or rod-shaped intermetallic precipitates inside the aluminum matrix cells. FIGS. 12C and 12D show an example rod- or plate-shaped intermetallic precipitate approximately 2 nm thick.

Figure 13A:
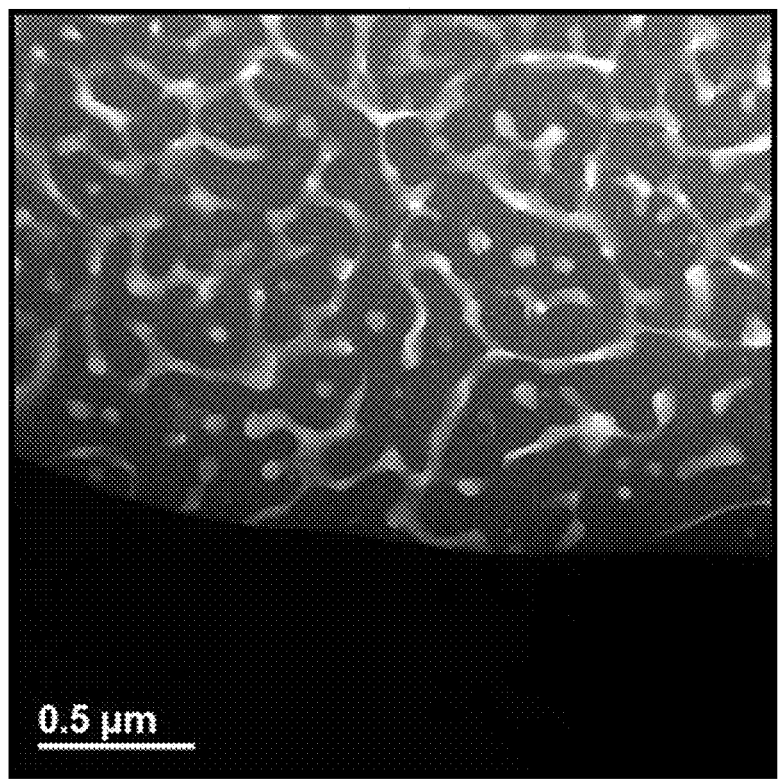
FIGS. 13A-13C show scanning transmission electron microscopy micrographs of an Al—Ce—Cu—Zr alloy according to embodiments disclosed herein, wherein dark regions shown are aluminum matrix phase and bright regions shown are the intermetallic phase. Also shown are rounded and rod- or-plate-shaped precipitates within the aluminum matrix features.
Figure 13B:
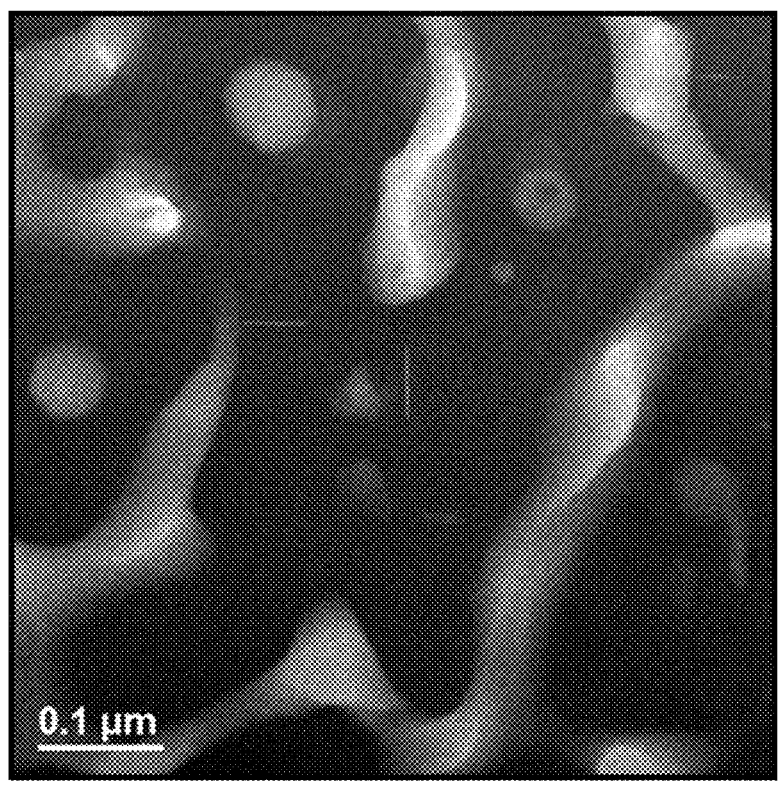
Figure 13C:
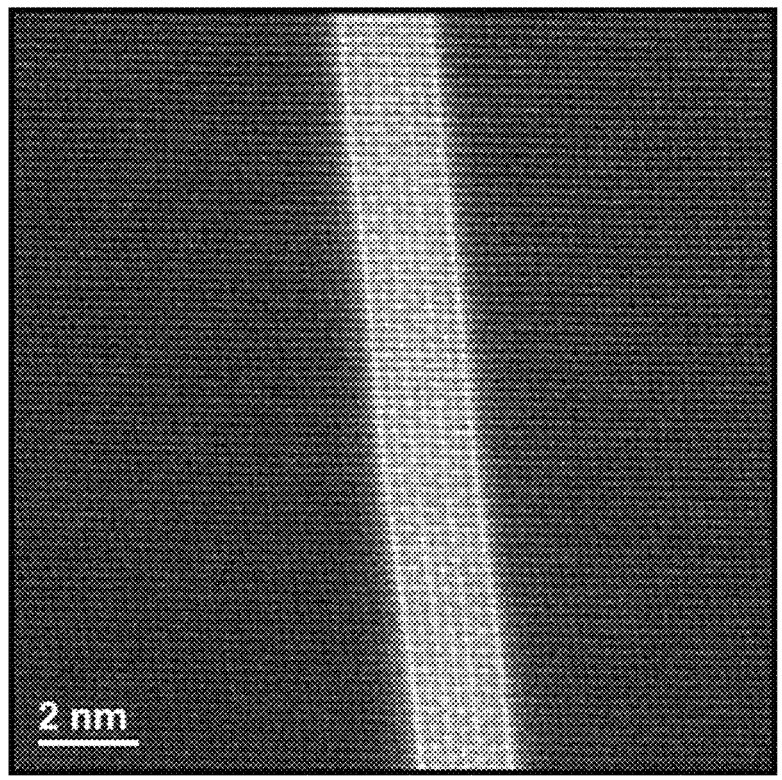

FIGS. 13A through 13C show the microstructure of the Al-6Ce-9Cu-1Zr alloy. The aluminum matrix phase of the Al-6Ce-9Cu-1Zr alloy as dark, cellular or nodular regions. The intermetallic phase of the Al-6Ce-9Cu-1Zr alloy is shown as the lattice-like bright region separating individual cells or nodules of the aluminum matrix. FIG. 13A shows a relatively uniform microstructure having irregularly shaped aluminum matrix cells of up to about 2 μm in size and an intermetallic phase 10 nm to 50 nm thick separating the aluminum matrix cells. Bright, spherical precipitates and smaller bright rod- or plate-shaped precipitates are additionally shown formed in the aluminum matrix cells or nodules in FIGS. 13A through 13C. FIG. 13B shows the same structure at higher magnification and also clarifies the presence of the plate- or rod-shaped intermetallic precipitates. FIG. 13C shows a plate- or rod-shaped intermetallic precipitate formed within an aluminum matrix cell.

Example 8

In this example, samples were fabricated from the Al-6Ce-9Cu-1Zr alloy with varying fabrication parameters according to Table 3. Fabrication was done on a Concept Laser M2 LPBF system. The laser power used during fabrication was 900 W. Layer thickness during fabrication was 30 μm. Samples were fabricated on a base preheated to 80° C. Samples were built at laser travel speeds of 2000, 3000, 4000, and 5000 mm/s.

TABLE 3

| Additive Manufacturing Fabrication Parameter | |
|---|---|
| Parameter | Value |
| Power | 900 W |
| Spot Size | 95 micron |
| Layer Thickness | 30 micron |
| Substrate Preheat | 80° C. |
| Laser Travel Speed | Variable |

Figure 14C:
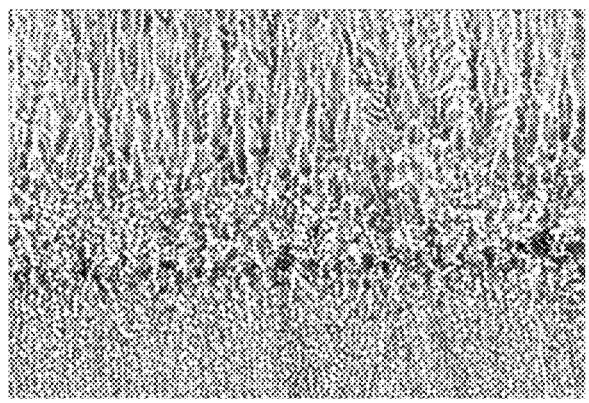
FIG. 14C shows the microstructure of a sample fabricated with a laser travel speed of 4000 mm/s.
Figure 14D:
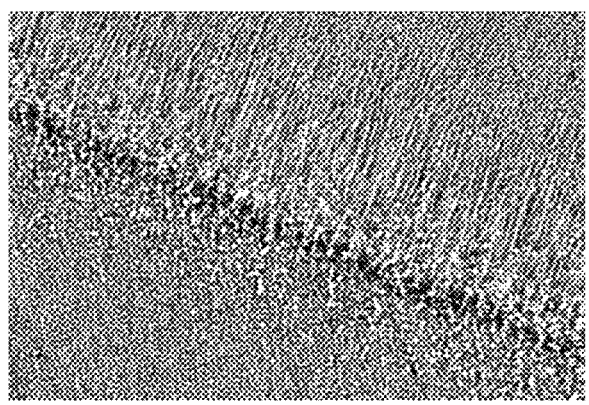
FIG. 14D shows the microstructure of a sample fabricated with a laser travel speed of 5000 mm/s.

FIGS. 14A through 14D are micrographs showing representative microstructures of the fabricated Al-6Ce-9Cu-1Zr samples. FIG. 14A shows the microstructure of a sample fabricated with a laser travel speed of 2000 mm/s. FIG. 14B shows the microstructure of a sample fabricated with a laser travel speed of 3000 mm/s. FIG. 14C shows the microstructure of a sample fabricated with a laser travel speed of 4000 mm/s. FIG. 14C shows the microstructure of a sample fabricated with a laser travel speed of 4000 mm/s. FIG. 14D shows the microstructure of a sample fabricated with a laser travel speed of 5000 mm/s. Higher laser travel speeds result in finer microstructures of the fabricated samples.

Figure 15:
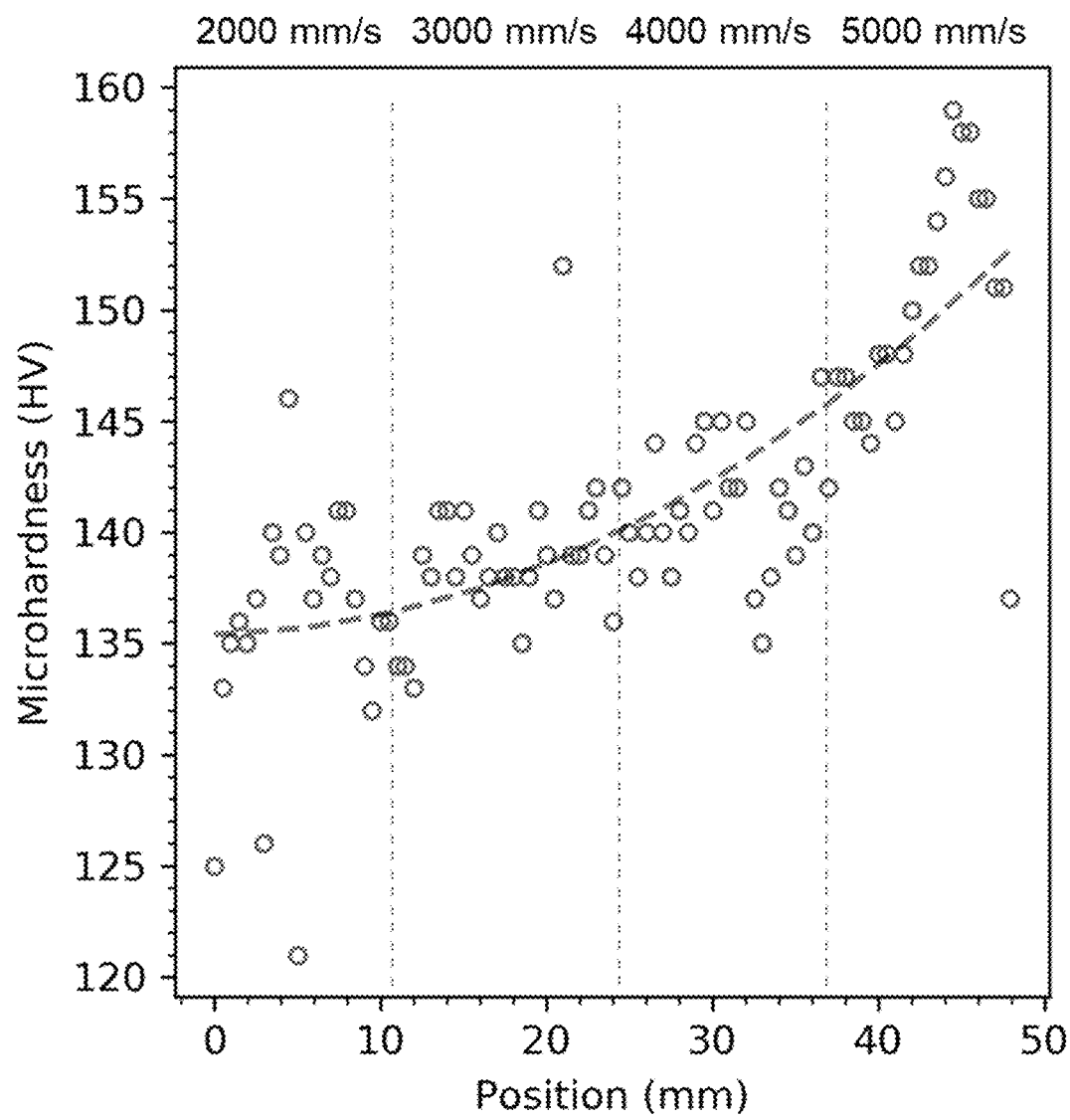
FIG. 15 shows the HV microhardness data for additively manufactured samples of an Al—Ce—Cu—Zr alloy according to embodiments disclosed herein, grouped by laser travel speed.

The Vickers hardness of the fabricated samples was measured in the as-fabricated condition. FIG. 15 shows the Vickers hardness (HV) values for the fabricated samples plotted against laser travel speed. As laser travel speed increases, HV values for the fabricated samples also increases.

In view of the many possible embodiments to which the principles of the present disclosure may be applied, it should be recognized that the illustrated embodiments are only preferred examples and should not be taken as limiting the scope of the present disclosure. Rather, the scope is defined We therefore claim as our invention all that comes within the scope and spirit of these claims.

We claim:
1. A powder alloy composition, comprising:
6 wt % to 35 wt % cerium;
3 wt % to 35 wt % copper;
greater than 0.5 wt % to 3 wt % manganese;
0 wt % to 3 wt % iron;
0 wt % to 2 wt % magnesium;
0 wt % to 2 wt % zirconium;
0 wt % to 2 wt % nickel;
0 wt % to 5 wt % chromium;
0 wt % to 0.1 wt % silicon;
a balance of aluminum; and
wherein the cerium and the copper are independently present in the powder alloy composition in an amount sufficient to cause the formation of at least one intermetallic selected from $Al_8CeCu_4$, $Al_{24}Cu_8Ce_3Mn$, $Al_{10}Cu_7Ce_2$, $Al_{11}Ce_3$, or $Al_2Cu$ upon additively manufacturing the powder alloy composition.

2. The powder alloy composition of claim 1, further comprising one or more of vanadium, titanium, hafnium, erbium, or scandium in an amount less than 1 wt % for each element taken individually.

3. The powder alloy composition according to claim 1, wherein the powder alloy composition provides, after additive manufacturing, an aluminum-based matrix phase with isolated features having an average length of 50 nm to 50 µm; and an intermetallic phase having lattice-like structures between the features of the aluminum-based matrix phase, with a thickness ranging from 10 nm to 100 nm.

4. The powder alloy composition of claim 1, wherein the cerium is present in an amount ranging from 6 wt % to 20 wt %.

5. The powder alloy composition of claim 1, wherein the copper is present in an amount ranging from 5 wt % to 25 wt %.

6. The powder alloy composition of claim 1, wherein the copper is present in an amount ranging from 5 wt % to 20 wt %.

7. The powder alloy composition of claim 1, wherein the powder alloy composition comprises 9 wt % copper, 6 wt % cerium, greater than 0.5 wt % to 3 wt % manganese, and a balance of aluminum.

8. The powder alloy composition of claim 1, wherein the powder alloy composition comprises 9 wt % copper, 6 wt % cerium, greater than 0.5 wt % to 3 wt % manganese, between 0.2 wt % and 1.0 wt % zirconium, and a balance of aluminum.

9. A fabricated object made from the powder alloy composition of claim 1, wherein the fabricated object comprises a heterogeneous microstructure having (i) an aluminum-based matrix phase; and (ii) an intermetallic phase, wherein:
the aluminum-based matrix phase further comprises isolated features with an average length of 50 nm to 50 µm; and
the intermetallic phase further comprises lattice-like structures between the isolated features of the aluminum-based matrix, the lattice-like structures having a thickness ranging from 10 nm to 100 nm.

10. The fabricated object of claim 9, wherein the heterogeneous microstructure further comprises a precipitate phase.

11. The fabricated object of claim 9, wherein the aluminum-based matrix phase further comprises manganese, copper, and/or zirconium in solid solution.

12. The fabricated object of claim 9, wherein the intermetallic phase comprises $Al_{24}Cu_8Ce_3Mn$ and at least one of $Al_8CeCu_4$, $Al_{10}Cu_7Ce_2$, $Al_2Cu$, or $Al_{11}Ce_3$.

13. The fabricated object of claim 10, wherein the precipitate phase is one or more of $Al_3Zr$, $Al_3V$, $Al_3Ti$, $Al_3Hf$, $Al_3Er$, and $Al_3Sc$.

14. A powder alloy composition for additive manufacturing, comprising:
greater than 0.5 wt % manganese;
6 wt % to 35 wt % cerium;
copper;
0 wt % to 0.1 wt % silicon; and
a balance of aluminum
wherein the cerium and copper are independently present in the powder alloy composition at an amount sufficient to provide at least one of an $Al_8CeCu_4$, $Al_{24}Cu_8Ce_3Mn$, $Al_{10}Cu_7Ce_2$, $Al_{11}Ce_3$, or $Al_2Cu$ intermetallic phase in an additively manufactured component made from the powder alloy composition.

15. The powder alloy composition of claim 14, further comprising one or more additive alloying elements selected from zirconium, manganese, magnesium, iron, silicon, nickel, vanadium, titanium, hafnium, erbium, or scandium.

16. A method, comprising:
(a) combining aluminum with (i) copper in an amount ranging from 3 wt % and 35 wt %, and (ii) cerium in an amount ranging from 6 wt % to 35 wt % to form a powder aluminum-based alloy composition;
(b) adding a first amount of feedstock comprising the powder aluminum-based alloy composition to a build platform;
(c) exposing the first amount, or a portion thereof, of the feedstock to an energy source to provide a first energy-treated region on the build platform;
(d) adding a second amount of the feedstock to the build platform wherein the second amount of the feedstock is positioned immediately adjacent to the first energy-treated region on the build platform; and
(e) exposing the second amount, or a portion thereof, of the feedstock to the energy source to provide a second energy-treated region on the build platform.

17. The method of claim 16, further comprising repeating any of steps (b) through (e).

18. The method of claim 16, wherein the energy source is a laser.

19. The method of claim 16, wherein each of the first energy-treated region and the second energy treated region comprises a consolidated alloy formed from melting and consolidating particles of the feedstock.

20. The method of claim 16, wherein the method is used to make a fabricated bulk component comprising an Al—Ce—Cu alloy and comprising a heterogenous microstructure.

21. The method of claim 16, wherein step (a) further comprises (i) adding chromium in an amount less than or equal to 5 wt %; (ii) adding at least one of manganese or iron in an amount less than or equal to 3 wt % for each element taken individually; (iii) adding at least one of zirconium, magnesium, or nickel in an amount less than or equal to 2 wt % for each element taken individually; (iv) adding at least one of adding at least one of vanadium, titanium, hafnium, erbium, or scandium in an amount less than or equal to 1 wt % for each element taken individually; or any combination of (i), (ii), (iii) and/or (iv).

22. The powder alloy composition of claim 1, wherein the intermetallic phase comprises $Al_{24}Cu_8Ce_3Mn$ and at least one of $Al_8CeCu_4$, $Al_{10}Cu_7Ce_2$, $Al_2Cu$, or $Al_{11}Ce_3$.

* * * * *